(12) United States Patent
Nagata et al.

(10) Patent No.: US 9,718,439 B2
(45) Date of Patent: Aug. 1, 2017

(54) WEBBING TAKE-UP DEVICE

(75) Inventors: Tomonori Nagata, Aichi-ken (JP);
Hiroaki Yamazoe, Aichi-ken (JP);
Shinichi Okubo, Aichi-ken (JP);
Keiichi Kato, Aichi-ken (JP)

(73) Assignee: KABUSHIKI KAISHA TOKAI-RIKA-DENKI-SEISAKUSHO, Aichi-Ken (JP)

( * ) Notice: Subject to any disclaimer, the term of this patent is extended or adjusted under 35 U.S.C. 154(b) by 1341 days.

(21) Appl. No.: 13/178,241

(22) Filed: Jul. 7, 2011

(65) Prior Publication Data

US 2012/0006927 A1    Jan. 12, 2012

(30) Foreign Application Priority Data

Jul. 9, 2010 (JP) ................ 2010-157025
Jan. 20, 2011 (JP) ................ 2011-010010

(51) Int. Cl.
B60R 22/46 (2006.01)
(52) U.S. Cl.
CPC ...... B60R 22/4628 (2013.01); B60R 22/4633 (2013.01)
(58) Field of Classification Search
CPC .. B60R 22/4628; B60R 22/4633; B60R 22/46
USPC .......... 242/374; 60/632; 280/736, 737, 806
See application file for complete search history.

(56) References Cited

U.S. PATENT DOCUMENTS

| | | | | |
|---|---|---|---|---|
| 4,421,342 A | * | 12/1983 | Brown, Jr. ............... | 280/740 |
| 5,265,813 A | * | 11/1993 | Fohl ........................ | 242/374 |
| 5,707,080 A | * | 1/1998 | Isaji et al. ................ | 280/806 |
| 5,875,634 A | * | 3/1999 | Wohlenberg ........ | B60R 22/4628 242/374 |
| 5,924,730 A | * | 7/1999 | Burrow et al. ............. | 280/806 |
| 6,363,722 B1 | * | 4/2002 | Takehara et al. .......... | 60/632 |
| 6,419,176 B1 | * | 7/2002 | Mizuno .................... | 242/374 |
| 6,726,250 B2 | * | 4/2004 | Ennerdal ................... | 280/806 |
| 6,729,649 B1 | * | 5/2004 | Schmidt ............ | B60R 22/4676 280/805 |
| 8,123,249 B2 | * | 2/2012 | Zischka .................... | 280/741 |
| 8,585,091 B2 | * | 11/2013 | Benz et al. ............... | 280/806 |
| 8,641,097 B2 | * | 2/2014 | Hodatsu et al. ........... | 280/806 |

(Continued)

FOREIGN PATENT DOCUMENTS

| | | | | |
|---|---|---|---|---|
| DE | 4331027 A1 | * | 3/1995 | ............ B60R 22/46 |
| JP | 2008-024102 A | | 2/2008 | |
| JP | 2010-018071 A | | 1/2010 | |

*Primary Examiner* — Sang Kim
(74) *Attorney, Agent, or Firm* — Roberts Mlotkowski; Safran Cole & Calderon P.C.

(57) ABSTRACT

When disassembling after a gas being supplied into a tube member, the gas in the tube member is discharged before the tube member and a moving member become separable. In a webbing take-up device, a cover plate cannot be removed from a frame and thereafter a cylinder and a piston inside the cylinder cannot be separated before covering of a fixing screw with a covering section of a plate being released by removing a screw from an exhaust port of the cylinder and by removing the plate from the cylinder. Thus, after a high-pressure gas being supplied into the cylinder, the high-pressure gas inside the cylinder can surely be discharged by removing the plate from the cylinder and the exhaust port is opened by the screw before the cylinder and the piston being separated.

11 Claims, 16 Drawing Sheets

(56) References Cited

U.S. PATENT DOCUMENTS

| | | | |
|---|---|---|---|
| 2005/0194771 A1* | 9/2005 | Clark et al. | 280/736 |
| 2006/0261582 A1* | 11/2006 | Fischer et al. | 280/736 |
| 2010/0037610 A1* | 2/2010 | Singer | 60/632 |
| 2014/0110518 A1* | 4/2014 | Nakayama | B60R 22/4633 242/374 |

* cited by examiner

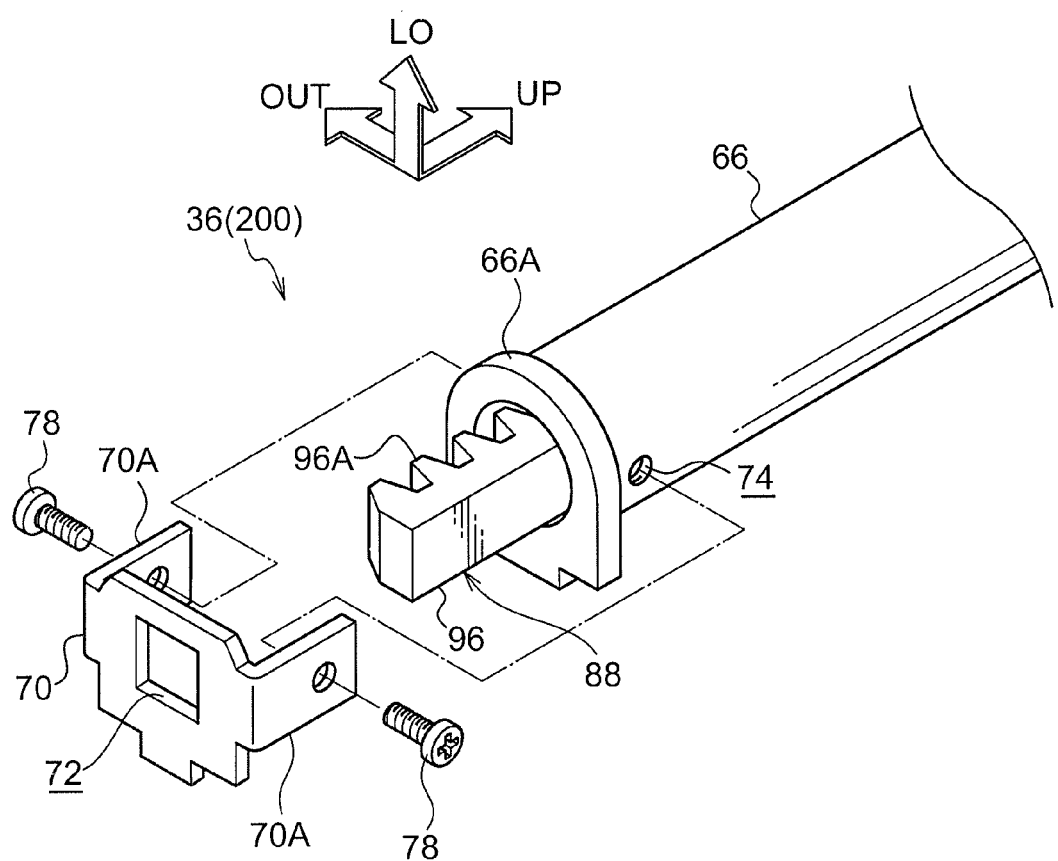

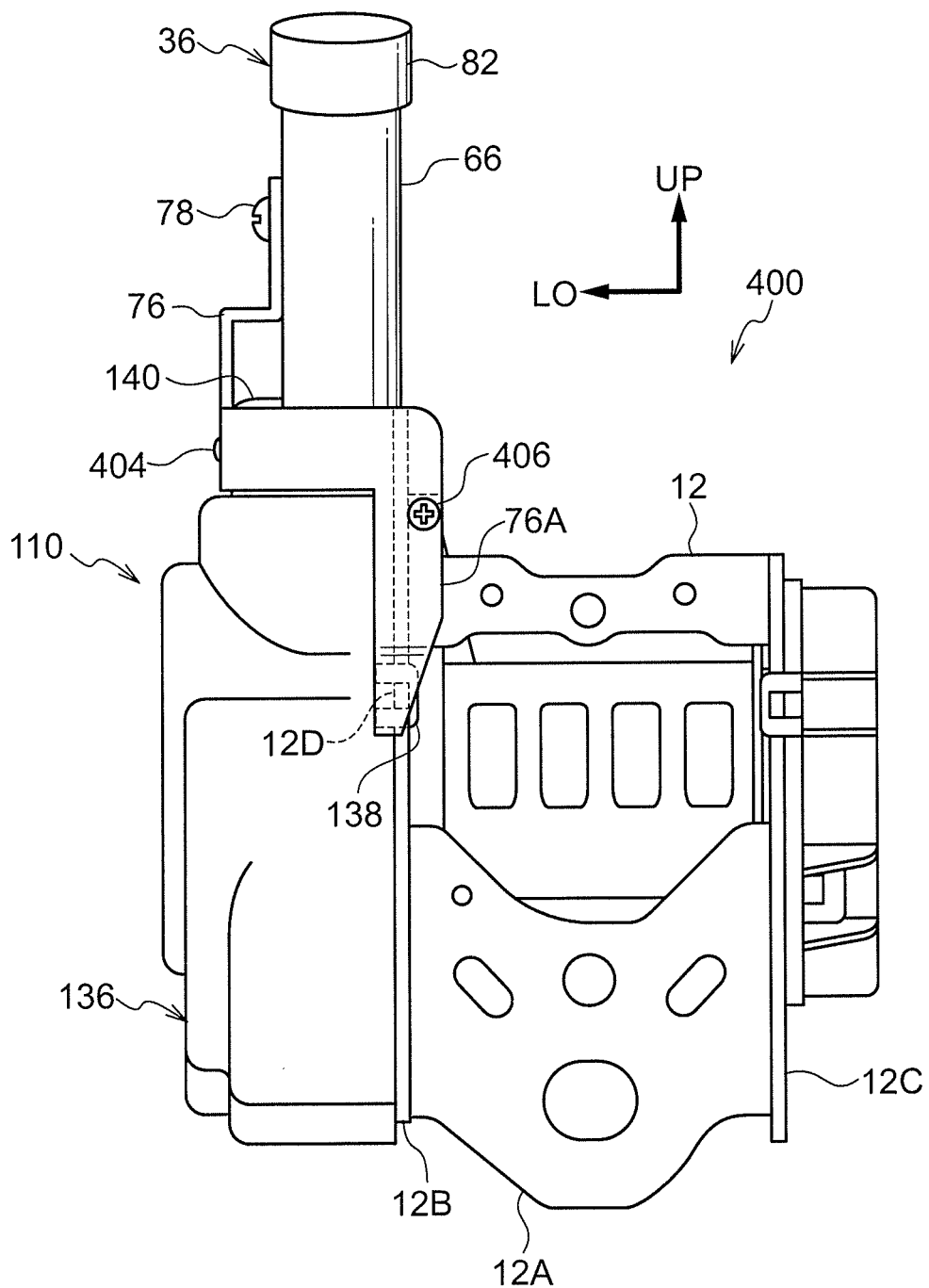

WEBBING TAKE-UP DEVICE

CROSS-REFERENCE TO RELATED APPLICATION

This application claims priority under 35 USC 119 from Japanese Patent Applications No. 2010-157025 filed Jul. 9, 2010 and No. 2011-010010 filed Jan. 20, 2011, the disclosures of which are incorporated by reference herein.

BACKGROUND OF THE INVENTION

Field of the Invention

The present invention relates to a webbing take-up device in which webbing is wound around a winding shaft by a moving member being moved by pressure of a gas supplied into a tube member.

Related Art

In a webbing take-up device described in Japanese Patent Application Laid-Open (JP-A) Nos. 2010-18071 and 2008-24102, a piston (a piston ball) is moved to the side of the other end by pressure of a gas supplied through and into one end of a pipe (a pipe cylinder), and a webbing (seat belt) is wound around a spool (a guide drum).

In the webbing take-up device, it is preferable to be able to discharge the gas which is inside the pipe before the pipe and the piston become separable when the webbing take-up device is disassembled after the gas being supplied into the pipe.

SUMMARY OF THE INVENTION

In consideration of the above fact, an object of the present invention is to provide a webbing take-up device capable of discharging a gas inside a tube member before the tube member and a moving member can be separated when the webbing take-up device is disassembled after the gas being supplied into the tube member.

A webbing take-up device of a first aspect of the invention includes a winding shaft that winds a webbing applied to a passenger of a vehicle by rotating in a winding direction; a tube member, into one side of which a gas is supplied at a predetermined occasion; a moving member that is moved to the other side of the tube member by pressure of the gas supplied into the one side of the tube member thereby rotating the winding shaft in the winding direction; a removal member, at least a portion thereof being attached to the tube member, which makes the tube member and the moving member separable after the removal member is removed; and a closing member that closes an exhaust port provided in the tube member and allows the gas in the tube member to be discharged via the exhaust port by the exhaust port being opened when the removal member is removed.

According to a webbing take-up device of a second aspect of the invention, in the webbing take-up device of the first aspect of the invention, the closing member attaches the removal member to the tube member.

According to a webbing take-up device of a third aspect of the invention, in the webbing take-up device of the first or second aspect of the invention, the closing member closes the exhaust port by being made unmovable by the removal member.

According to a webbing take-up device of a fourth aspect of the invention, in the webbing take-up device of one of first to third aspects of the invention, the removal member is attached at a plurality of locations.

A webbing take-up device of a fifth aspect of the invention, in the webbing take-up device of one of first to fourth aspects of the invention, further includes a restriction section that is provided at the removal member, the restriction section restricting separation of the tube member and the moving member and allowing separation of the tube member and the moving member when the removal member is removed.

According to a webbing take-up device of a sixth aspect of the invention, in the webbing take-up device of one of first to fifth aspects of the invention, the removal member constitutes an outer circumference of the webbing take-up device.

According to the webbing take-up device of the first aspect of the invention, the winding shaft is rotated in the winding direction by the moving member being moved to the other side of the tube member by pressure of the gas with the gas being supplied in the one side of the tube member at the predetermined occasion to wind the webbing around the winding shaft.

The exhaust port provided in the tube member is closed by the closing member. Further, when the webbing take-up device is disassembled, the tube member and the moving member become separable after the removal member being removed.

When the removal member is removed, the gas inside the tube member becomes dischargeable via the exhaust port by the exhaust port being opened by the closing member.

Thus, when the webbing take-up device is disassembled after the gas being supplied into the tube member, the gas in the tube member can be discharged before the tube member and the moving member become separable by the exhaust port being opened by the closing member when the removal member is removed.

In the webbing take-up device of the second aspect of the invention, the closing member attaches (mounts) the removal member on the tube member. Thus, the work to remove the removal member from the tube member becomes the work in which the closing member opens the exhaust port, so when the removal member is removed from the tube member, the closing member can automatically open the exhaust port.

In the webbing take-up device of the third aspect of the invention, the closing member closes the exhaust port by being made unmovable by the removal member. Thus, any configuration in which the closing member is made unmovable by the removal member may be adopted, which increases flexibility of the shape and material of the closing member so that the closing member can close the exhaust port effectively.

In the webbing take-up device of the fourth aspect of the invention, the removal member is attached in plural locations.

Thus, when the webbing take-up device is disassembled after a gas being supplied into the tube member, movement of the removal member can be suppressed by maintaining of the state in which the removal member is attached even if the closing member opens the exhaust port.

In the webbing take-up device of the fifth aspect of the invention, the restriction section is provided in the removal member and the restriction section restricts separation of the tube member and the moving member.

When the removal member is removed, the restriction section allows the separation of the tube member and the moving member. Thus, the tube member and the moving member can be made separable after the removal member being removed with a simple configuration.

In the webbing take-up device of the sixth aspect of the invention, the removal member constitutes an outer circumference of the webbing take-up device. Thus, it is suppressed that the removal member is present inside the webbing take-up device, and parts on the outer circumference side than the removal member of the webbing take-up device become larger.

BRIEF DESCRIPTION OF THE DRAWINGS

Embodiments of the invention will be described in detail with reference to the following figures, wherein:

FIG. 1A is a perspective view when viewed from an inner side and an upper side in a vehicle width direction, and FIG. 1B is a sectional view when viewed from one side in a vehicle front and rear direction;

FIG. 9A is a perspective view when viewed from the inner side and the upper side in the vehicle width direction, and FIG. 9B is a sectional view when viewed from one side in the vehicle front and rear direction;

FIG. 10A is a perspective view when viewed from the inner side and a lower side in the vehicle width direction, and FIG. 10B is a sectional view when viewed from the inner side in the vehicle width direction;

FIG. 11 is an exploded perspective view showing principal sections of the webbing take-up device according to the third embodiment of the invention when viewed from the inner side and the lower side in the vehicle width direction;

FIG. 12A is a perspective view, and FIG. 12B is an exploded perspective view;

FIG. 16 is a rear view showing the webbing take-up device according to the fifth embodiment of the invention when viewed from the inner side in the vehicle width direction.

DETAILED DESCRIPTION OF THE INVENTION

First Embodiment

Figure 2:
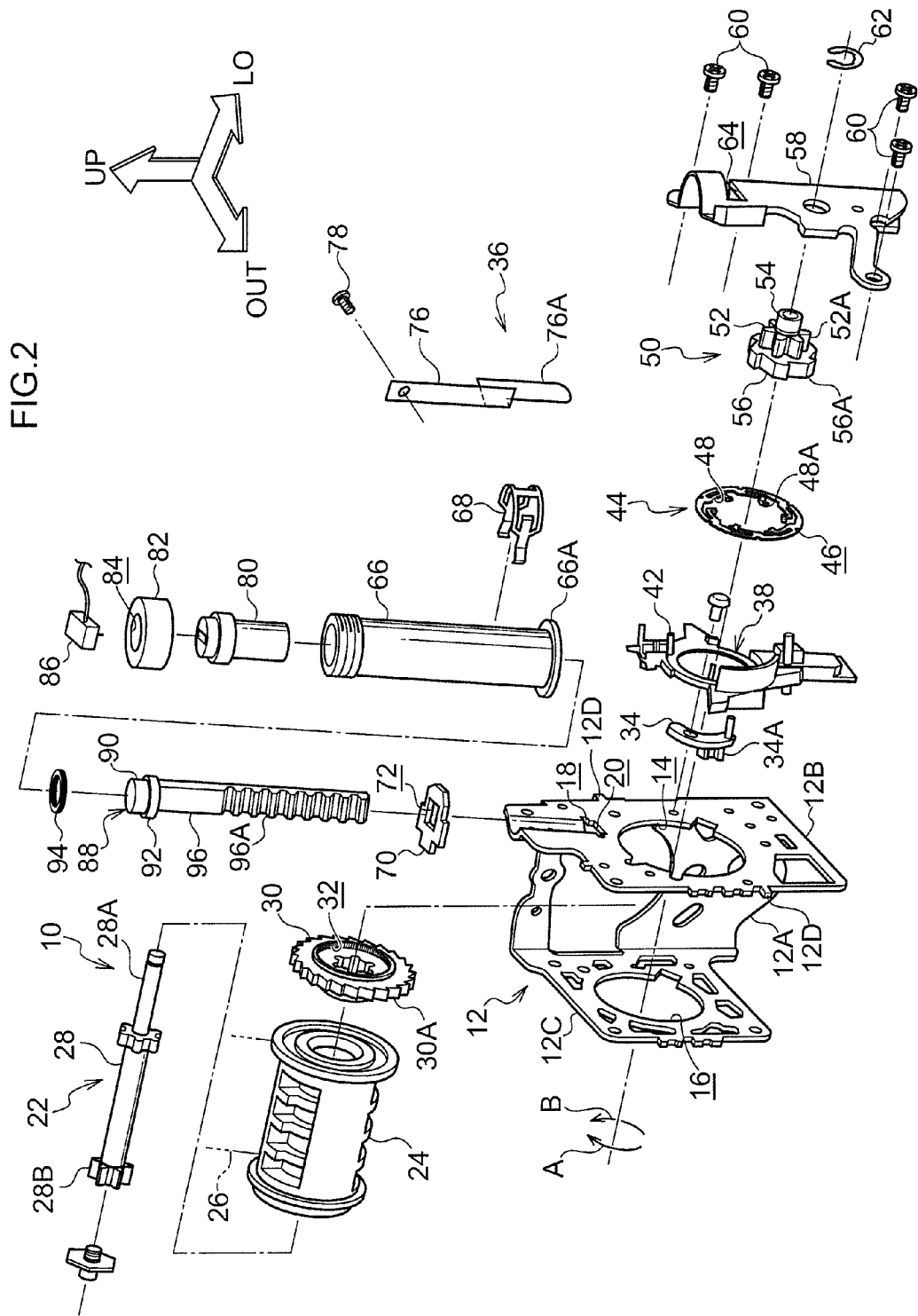
FIG. 2 is an exploded perspective view showing a main body side portion of the webbing take-up device according to the first embodiment of the present invention when viewed from an outer side in the vehicle width direction and from one side in the vehicle front and rear direction.
Figure 4:
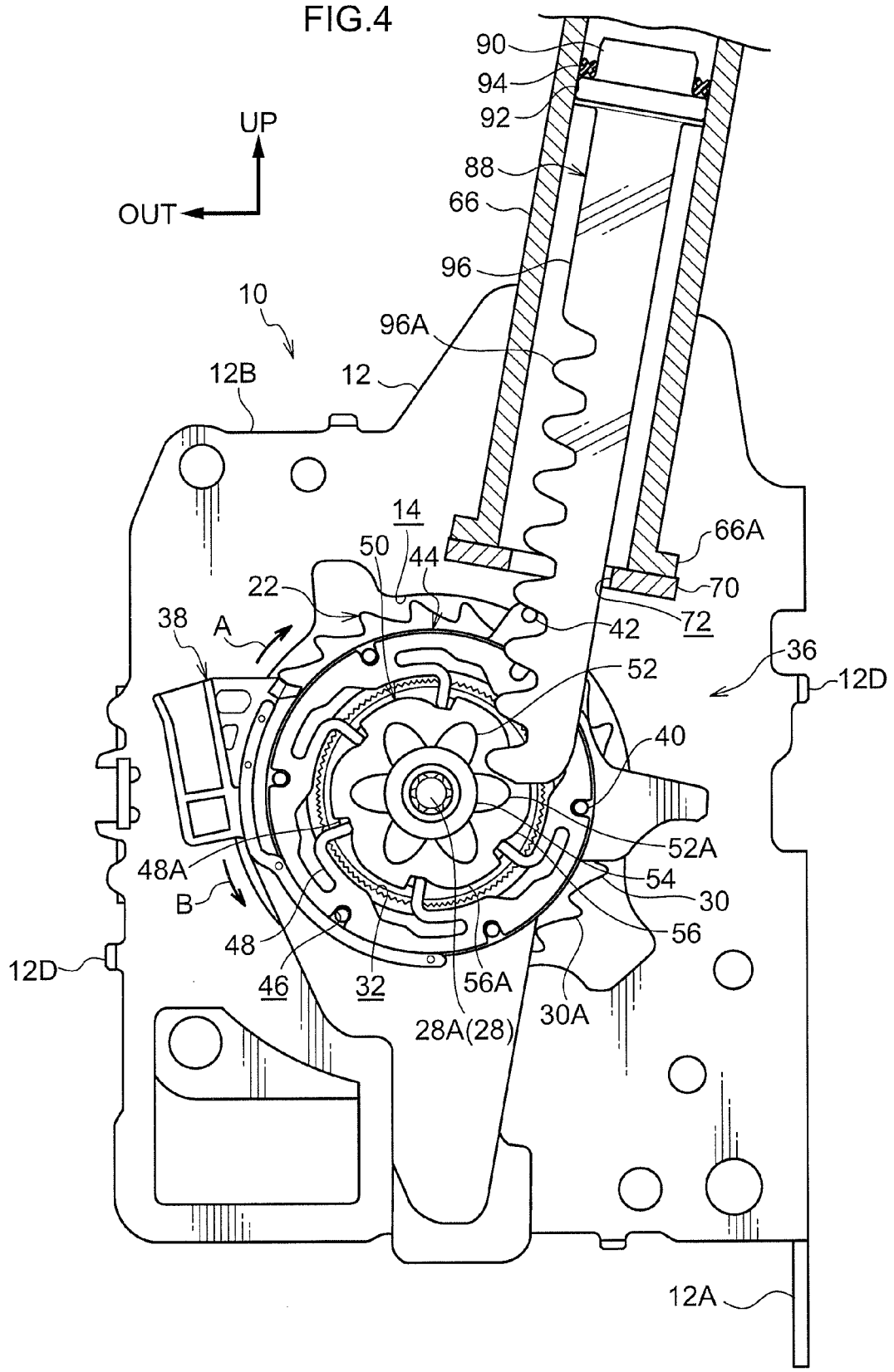
FIG. 4 is a side view showing the main body side portion of the webbing take-up device according to the first embodiment of the invention when viewed from one side in the vehicle front and rear direction.

A main body side portion of a webbing take-up device 10 according to a first embodiment of the present invention is shown in FIG. 2 as an exploded perspective view when viewed from the outer side in the vehicle width direction and from one side in the vehicle front and rear direction and the main body side portion of the webbing take-up device 10 is shown in FIG. 4 as an a side view when viewed from one side in the vehicle front and rear direction. In the drawings, the outer side in the vehicle width direction is indicated by an arrow OUT, one side in the vehicle front and rear direction by an arrow LO, and an upward direction by an arrow UP.

As shown in FIGS. 2 and 4, the webbing take-up device 10 according to the present embodiment is provided with a frame 12 in a plate shape having a U-shaped cross section as a main body member, and a back plate 12A on the inner side in the vehicle width direction, a leg plate 12B on one side in the vehicle front and rear direction, and a leg plate 12C on the other side in the vehicle front and rear direction are provided in the frame 12. The back plate 12A of the frame 12 is fixed to a vehicle and thereby, the webbing take-up device 10 is installed in the vehicle.

The leg plate 12B and the leg plate 12C have an arranging hole 14 and an arranging hole 16 in a circular shape penetrate-formed therethrough respectively, and the arranging hole 14 and the arranging hole 16 face each other. The leg plate 12B has a first anchor (connect or catch) hole 18 in a long rectangular shape penetrate-formed therethrough above the arranging hole 14 and on the side of the back plate 12A, and the first anchor hole 18 is arranged substantially horizontally. The leg plate 12B has a second anchor (connect or catch) hole 20 in a long rectangular shape penetrate-formed therethrough immediately below the first anchor hole 18, and the second anchor hole 20 is arranged in parallel with the first anchor hole 18 and communicatively connected to the first anchor hole 18.

A winding (take up) shaft 22 is rotatably supported between the leg plate 12B (the arranging hole 14) and the leg plate 12C (the arranging hole 16) of the frame 12.

The winding shaft 22 is provided with a spool 24 in a substantially cylindrical shape as a winding (take-up) member, and a webbing 26 (a belt) in a long belt shape is wound around the spool 24 from the base side. The webbing 26 extends upward from the frame 12, and the webbing 26 can be applied to a passenger sitting in a seat (not shown in the drawings) of the vehicle. The webbing 26 is wound around the spool 24 by the spool 24 being rotated in a winding (take up) direction (direction of an arrow A in FIGS. 2 and 4), and the spool 24 is rotated in a drawing (pulling out) direction (direction of an arrow B in FIGS. 2 and 4) by the webbing 26 being pulled out from the spool 24.

The spool 24 has a torsion shaft 28 as an energy absorbing member constituting a force limiter mechanism inserted coaxially and one end 28A of the torsion shaft 28 on the leg plate 12B side is protruded from one end face of the spool 24 on the leg plate 12B side. The other end 28B of the torsion shaft 28 on the leg plate 12C side is relatively non-rotatably fixed to the other end of the spool 24 on the leg plate 12C side so that the torsion shaft 28 is made rotatable integrally with the spool 24.

The spool 24 has a lock gear 30 in a substantially column-cylindrical shape provided at one end thereof as a rotation member, and in the lock gear 30, the torsion shaft 28 is passed through. The torsion shaft 28 is relatively non-rotatably fixed to the lock gear 30 so that the lock gear 30 is made rotatable integrally with the torsion shaft 28. Ratchet teeth 30A (external teeth) are formed over an entire outer circumference of the lock gear 30.

A clutch recess portion 32 in a cylindrical shape constituting a clutch mechanism is formed on the surface of the gear lock 30 on the opposite side of the spool 24 and an outer circumferential surface of the clutch recess portion 32 has a high coefficient of friction.

An urging mechanism (not shown in the drawings) as an urging unit is provided on the outer side of the leg plate 12C of the frame 12 and the urging mechanism is coupled to the spool 24 to act an urging force on the spool 24 in the winding direction.

A lock plate 34 in a plate shape as a regulating member (a lock member) is rotationally movably supported by the leg plate 12B of the frame 12 near the arranging hole 14 and the lock plate 34 has lock teeth 34A formed thereon. The lock plate 34 is connected to a lock mechanism 110 as a regulating unit (a lock unit) as described later and when the webbing 26 is pulled out rapidly from the spool 24 or the vehicle is rapidly decelerated, the lock mechanism 110 is actuated to rotationally move the lock plate 34 and the lock teeth 34A are meshed (engaged) with the ratchet teeth 30A of the lock gear 30. Accordingly, the rotation of the lock gear 30 in the pull out direction is regulated (locked) and the rotation of the spool 24 in the pull out direction is regulated (the rotation of the spool 24 in the winding direction is allowed).

A pretensioner mechanism 36 based on a rack-and-pinion system is provided on the outer side of the leg plate 12B of the frame 12.

The pretensioner mechanism 36 is provided with a gear case 38 made of resin and having a substantially annular shape as a holding member and the gear case 38 is fixed to the leg plate 12B. An outer circumferential section of the gear case 38 covers an outer circumferential portion of the lock gear 30 and the clutch recess portion 32 of the lock gear 30 is arranged inside the gear case 38, and in the gear case 38, the one end 28A of the torsion shaft 28 is passed through.

A predetermined number of holding pins 40 (shear pins) in a column-cylindrical shape are integrally formed in the outer circumferential section of the gear case 38 and the holding pins 40 are protruded from the gear case 38 toward the opposite side of the lock gear 30. An anchor (connect) pin 42 (shear pin) in the column-cylindrical shape is integrally formed in an upper part of the gear case 38 and the anchor pin 42 is protruded from the gear case 38 toward the opposite side of the leg plate 12B.

A clutch plate 44 in a substantially annular shape as a clutch member constituting the clutch mechanism is arranged on the opposite side of the lock gear 30 of the gear case 38. A predetermined number of mounting holes 46 in a semicircular shape are formed on an outer circumferential edge of the clutch plate 44 and the predetermined number of mounting holes 46 are arranged along a circumferential direction of the clutch plate 44 at regular intervals. The holding pins 40 of the gear case 38 are fitted into the mounting holes 46 whereby the clutch plate 44 is held to the gear case 38.

A predetermined number (six in the present embodiment) of projecting sections 48 in an L plate shape are integrally formed on an inner circumference of the clutch plate 44 and the predetermined number of projecting sections 48 are arranged along the circumferential direction of the clutch plate 44 at regular intervals. A meshing section 48A in a columnar shape is integrally formed at the tip of the projecting section 48 and the meshing section 48A is protruded from the projecting section 48 toward the gear case 38 side and inserted into the clutch recess portion 32 of the lock gear 30 via the inside of the gear case 38. The meshing section 48A is spaced from the outer circumferential surface of the clutch recess portion 32 and so the clutch plate 44 allows the lock gear 30 to rotate.

A pinion 50 as a driving member is provided on the inner circumferential side of the clutch plate 44, and in the pinion 50, the one end 28A of the torsion shaft 28 is passed through coaxially and relatively rotatably. A gear 52 is provided in an intermediate portion in an axial direction of the pinion 50 and pinion teeth 52A are formed over the entire outer circumference of the gear 52. Further, a support tube 54 in the cylindrical shape is coaxially formed in a portion on the opposite side of the lock gear 30 of the pinion 50.

A clutch section 56 constituting the clutch mechanism is formed in a portion on the lock gear 30 side of the pinion 50 and the clutch section 56 is inserted into the clutch recess portion 32 of the lock gear 30. A predetermined number (six in the present embodiment) of convex portions 56A are formed on the outer circumferential surface of the clutch section 56 and the predetermined number of convex portions 56A are arranged along the circumferential direction of the clutch section 56 at regular intervals and the protruding heights of the convex portions 56A are set to gradually higher as further toward the pull out direction. The meshing section 48A of the clutch plate 44 is mounted (pressed and abutted) on the clutch section 56 in a portion on the side of the winding direction of each convex portion 56A whereby the pinion 50 is held to the clutch plate 44.

A cover plate 58 made of metal and having a plate shape as an assembling member is provided on the outer side of the leg plate 12B of the frame 12 and the cover plate 58 is fixed to the leg plate 12B by being fixed (tightened) to the leg plate 12B in a portion on the back plate 12A side in the upper part thereof by fixing screws 60 as two fixing members (units) and also being fixed (tightened) to the leg plate 12B in a portion on the back plate 12A side and in a portion on the opposite side of the back plate 12A in a lower part thereof each by one fixing screw 60. The cover plate 58 covers the gear case 38, the clutch plate 44, and the pinion 50 from the opposite side of the lock gear 30.

In the cover plate 58, the support tube 54 of the pinion 50 is passed through and the cover plate 58 freely rotatably supports the pinion 50. A K-ring 62 in a substantially C shape when viewed from the front as an anchor (connect) member is fitted and fixed to the support tube 54 of the pinion 50 on the opposite side of the leg plate 12B from the cover plate 58 and removal of the pinion 50 from the cover plate 58 is regulated by the K ring 62 being anchored to the cover plate 58.

The cover plate 58 has a third anchor (connect or catch) hole 64 in a long rectangular shape penetrate-formed through the upper part thereof and the third anchor hole 64 is arranged substantially horizontally to face the first anchor hole 18 and the second anchor hole 20 of the leg plate 12B.

A cylinder 66 in the cylindrical shape as a tube member is provided between the upper part of the leg plate 12B of the frame 12 and the upper part of the cover plate 58 and the cylinder 66 is projected upward from the leg plate 12B and the cover plate 58.

The cylinder 66 is fitted into a cylinder holder 68 in a plate shape having a U-shaped cross section above the cover plate 58 and the cylinder holder 68 is fixed to the leg plate 12B by being engaged with the upper part of the leg plate 12B at both ends thereof in the longitudinal direction. Accordingly, the cylinder holder 68 holds the cylinder 66 by restricting movement of the cylinder 66 in the diameter direction.

A circumferential edge section 66A is integrally formed at the lower end of the cylinder 66 and the circumferential edge section 66A is protruded over the entire outer circumference of the cylinder 66. The circumferential edge section 66A is fitted into the first anchor hole 18 of the leg plate 12B and an upper portion of the third anchor hole 64 of the cover plate 58.

A piston stopper 70 in a substantially rectangular plate shape as a stopper member is arranged immediately below the cylinder 66 and the piston stopper 70 is abutted (surface contacted) by the lower end (including the circumferential edge section 66A) of the cylinder 66 and fitted into a lower portion of the third anchor hole 64 of the cover plate 58 and the second anchor hole 20 of the leg plate 12B. Accordingly, movement of the piston stopper 70 and movement of the cylinder 66 in the axial direction are locked and the piston stopper 70 and the cylinder 66 are fixed between the leg plate 12B and the cover plate 58.

The piston stopper 70 has an insertion hole 72 in a rectangular shape penetrate-formed therethrough and the cylinder 66 is open at the above side of the pinion 50 via the insertion hole 72.

Figure 1A:
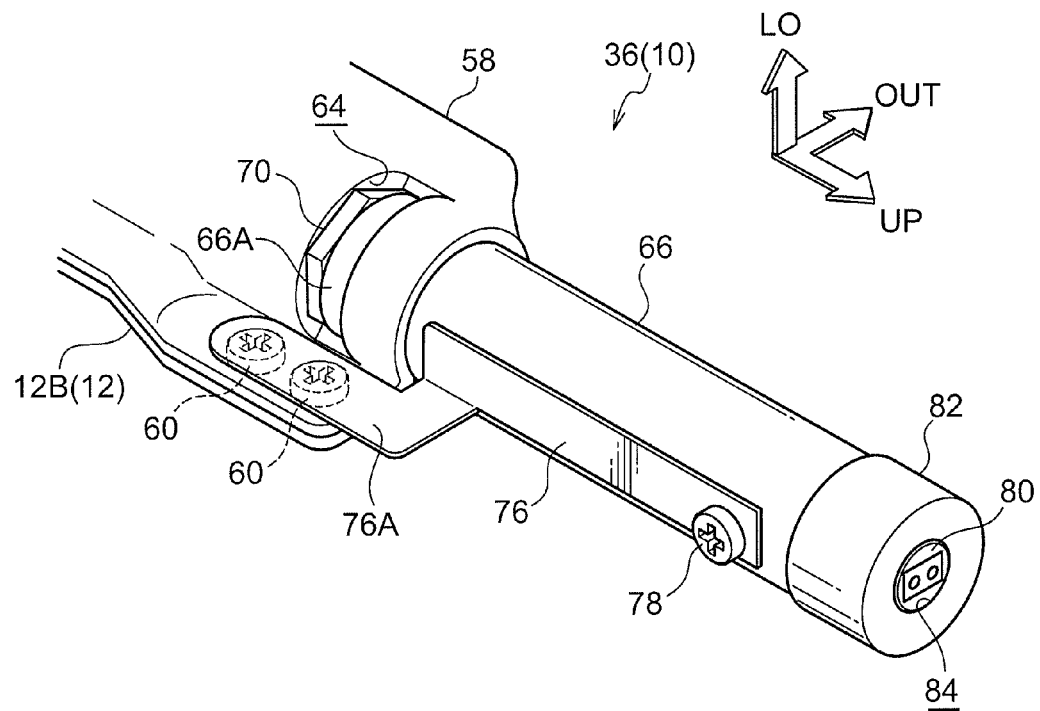
FIGS. 1A and 1B are diagrams showing principal sections of a webbing take-up device according to a first embodiment of the invention.
Figure 1B:
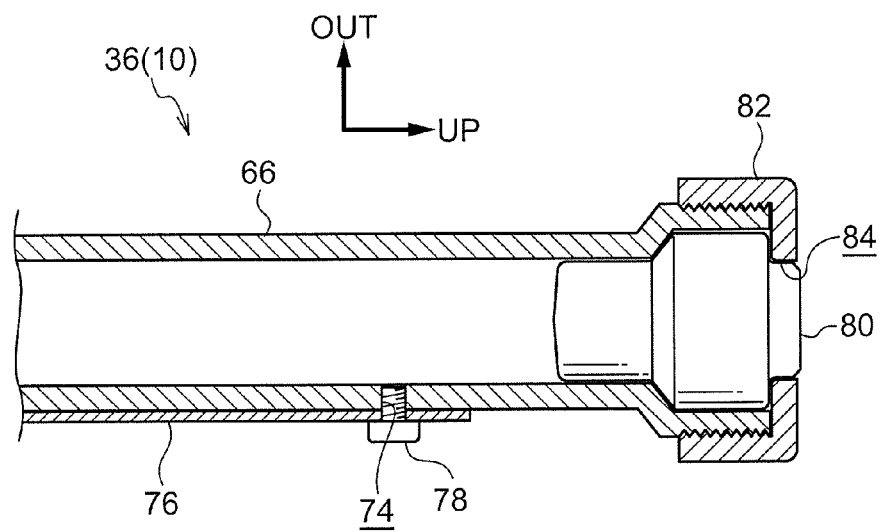

As shown in FIGS. 1A and 1B, the cylinder 66 has an exhaust hole 74 (a vent hole) in a circular shape, which is penetrate-formed at the upper part (near the upper end) of the cylinder 66. The upper end of a plate 76 in a long plate shape as a removal member (dismount member) is fixed (tightened) to the cylinder 66, at the exhaust hole 74, by a screw 78 as a closing member (a blocking member). That is, the screw 78 is screwed into the exhaust hole 74 and the screw 78 blocks (closes) the exhaust hole 74.

A covering section 76A as a restriction section is provided in the lower part of the plate 76. The covering section 76A is bent with regard to the other portion of the plate 76. The covering section 76A covers two (plural) fixing screws 60 at the upper part of the cover plate 58 so that the covering section 76A makes the two fixing screws 60 unremovable.

As shown in FIGS. 2 and 4, a gas generator 80 in a substantially column-cylindrical shape as a driving unit is fitted into the cylinder 66 from the upper end thereof and the gas generator 80 closes the upper end of the cylinder 66. A cap 82 in a cylindrical shape having a bottom as a fixing unit is fixed to the upper end of the cylinder 66. The gas generator 80 is fixed to the upper end inside the cylinder 66 by a upper wall (a bottom wall) of the cap 82 being anchored (caught) to the upper surface of the gas generator 80. The cap 82 has an exposure hole 84 in a circular shape penetrate-formed through in a center side portion of the upper wall (the bottom wall) thereof. The exposure hole 84 exposes the upper surface of the gas generator 80 upward.

A connector 86 is electrically connected to the gas generator 80 by being mounted thereon from the upper surface via the exposure hole 84 and the connector 86 is electrically connected to a control device (not shown in the drawings) of a vehicle. When the vehicle collides (a predetermined occasion in a vehicle emergency when the vehicle collision is detected), the gas generator 80 instantaneously generates a high-pressure gas by the pretensioner mechanism 36 being actuated under control of the control device to supply the gas to the upper end inside the cylinder 66.

A piston 88 as a moving member is provided inside the cylinder 66.

A base section 90 in a column-cylindrical shape is provided at the upper end of the piston 88 and the base section 90 is arranged coaxially with the cylinder 66. The piston 88 is provided with a flange 92 in a disk shape immediately below the base section 90. The flange 92 is arranged coaxially with the cylinder 66 and protruded over the entire outer circumference of the base section 90 to be substantially fitted to the inner circumferential surface of the cylinder 66.

An X ring 94 having an annular shape and a cross section in an X shape is arranged as a seal member on the outer circumference of the base section 90 and the X ring 94 is made of rubber or the like to have elasticity and sealing properties. The X ring 94 is in contact with the outer circumferential surface of the base section 90, upper surface of the flange 92, and inner circumferential surface of the cylinder 66 all therearound in a state of elastic deformation and the X ring 94 seals a space between the cylinder 66 and the piston 88.

The piston 88 is provided with a rack 96 in a substantially rectangular columnar shape below the flange 92 and rack teeth 96A are formed in a portion on the opposite side of the back plate 12A of the rack 96. The rack 96 is protruded from the lower end of the cylinder 66 and inserted into the insertion hole 72 of the piston stopper 70. The lower end of the rack 96 is arranged near the upper side of the gear 52 of the pinion 50 due to the rack teeth 96A being anchored (caught) to the anchor pin 42 of the gear case 38.

Figure 3:
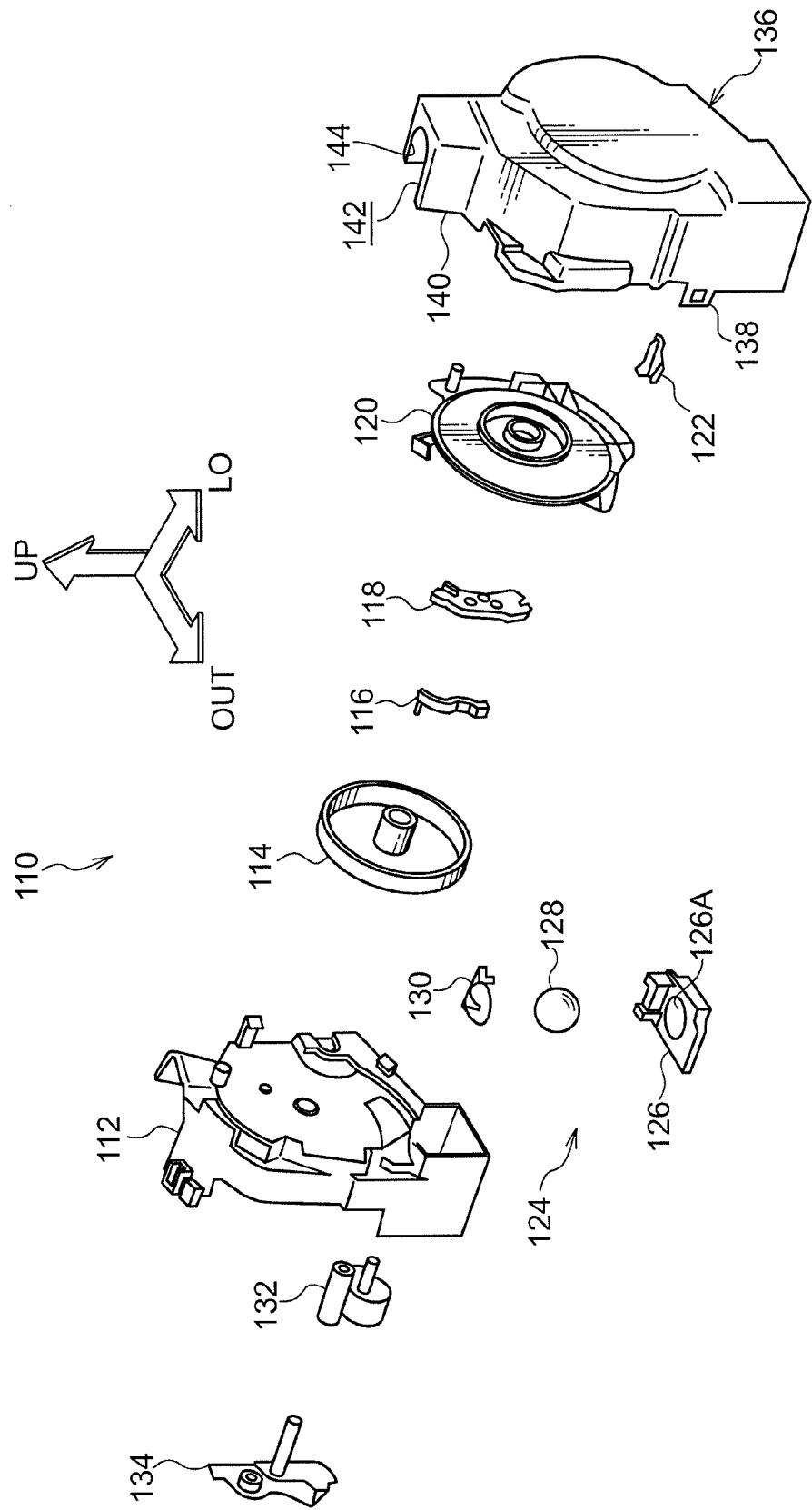
FIG. 3 is an exploded perspective view showing a lock mechanism of the webbing take-up device according to the first embodiment of the invention when viewed from the outer side in the vehicle width direction and from one side in the vehicle front and rear direction.

The lock mechanism 110 shown in FIG. 3 is provided on the opposite side of the leg plate 12B of the cover plate 58 on the outer side of the leg plate 12B of the frame 12.

The lock mechanism 110 includes a sensor holder 112 in a substantially rectangular parallelepiped box shape and the sensor holder 112 has the one end 28A of the torsion shaft 28 which is freely rotatably passed through the sensor holder 112.

A V gear 114 in a substantially cylindrical shape having a bottom as a first rotator is provided on the opposite side of the leg plate 12B of the sensor holder 112 and the V gear 114 is mounted on the one end 28A coaxially and integrally in a state of being passed through by the one end 28A of the torsion shaft 28. Also, ratchet teeth (not shown in the drawings) are formed over the entire outer circumference of the V gear 114.

A W pawl 116 as a communication unit is rotationally movably supported in a position spaced from the center axis in the radial direction inside the V gear 114 and one end of the W pawl 116 is spaced from a circumferential wall of the V gear 114.

An inertia mass 118 as an inertial body is swingably (rotationally movably) supported in a position spaced from the center axis in the radial direction inside the V gear 114 and the inertia mass 118 is arranged in the initial position thereof by being urged in the pull out direction with regard to the V gear 114 and arranges the W pawl 116 in the initial position thereof. When the webbing 26 is rapidly pulled out from the spool 24, the V gear 114 is rapidly rotated in the pull out direction and the inertia mass 118 is relatively swung in the winding direction with regard to the V gear 114. Accordingly, the inertia mass 118 brings one end of the W pawl 116 closer to the circumferential wall of the V gear 114 by rotationally moving the W pawl 116.

A sensor gear 120 in a substantially cylindrical shape having a bottom as a second rotator is provided on the opposite side of the leg plate 12B of the V gear 114 and the sensor gear 120 is coaxially and relatively rotatably supported by the center portion of the V gear 114 in a state of being passed through by the one end 28A of the torsion shaft 28 and inserted into the circumferential wall of the V gear 114. The sensor gear 120 is arranged in the initial position by being energized in the winding direction.

Ratchet teeth (not shown in the drawings) are coaxially formed over the entire inner circumference of the sensor gear 120 and the ratchet teeth are arranged inside the circumferential wall of the V gear 114. When the W pawl 116 is rotationally moved and one end of the W pawl 116 is brought closer to the circumferential wall of the V gear 114, one end of the W pawl 116 is engaged with ratchet teeth of the sensor gear 120 so that the sensor gear 120 is rotated in the pull out direction together with the V gear 114.

A V pawl 122 as a coupling unit is rotationally movably supported by the sensor gear 120 and one end of the V pawl 122 is meshed with ratchet teeth of the V gear 114 by the V pawl 122 being rotationally moved. Further, when the V gear 114 is rotated in the pull out direction in this state, the sensor gear 120 is rotated in the pull out direction together with the V gear 114.

An acceleration sensor 124 as an acceleration detection unit is arranged below the V pawl 122 and the acceleration sensor 124 is mounted on the sensor holder 112. The acceleration sensor 124 is provided with a housing 126 and the housing 126 is provided with a concave placement surface 126A. The placement surface 126A is open upward and inclined such that it is positioned upper as directed from the center toward the circumferential edge and a ball 128 (sphere) is placed on the placement surface 126A.

A lever 130 is placed above the ball 128 and the lever 130 is freely rotationally movably supported by the housing 126. When the vehicle is rapidly decelerated, the ball 128 rises by being rolled on the placement surface 126A to rotationally move the lever 130 upward and the lever 130 rotates the V pawl 122. Accordingly, one end of the V pawl 122 is meshed with ratchet teeth of the V gear 114. Further, when the webbing 26 is pulled out from the spool 24 by movement of a passenger caused by, for example, an inertial force and the V gear 114 is rotated in the pull out direction, the sensor gear 120 is rotated in the pull out direction together with the V gear 114.

A lever joint 132 as a transmission member is arranged near the V pawl 122 on the leg plate 12B side of the sensor gear 120. The lever joint 132 is freely rotationally movably supported by a shaft 134 and the shaft 134 is mounted on the leg plate 12B of the frame 12. The lever joint 132 passes through the sensor holder 112 while being allowed to rotationally move and the lever joint 132 is rotatably coupled to the sensor gear 120. Thus, when the sensor gear 120 is rotated in the pull out direction, the lever joint 132 is rotationally moved by the sensor gear 120.

The lever joint 132 is rotationally movably coupled to the lock plate 34 (see FIG. 2). As described above, when the webbing 26 is pulled out rapidly from the spool 24 or the vehicle is rapidly decelerated, the lock plate 34 is rotationally moved by the lever joint 132 by the lever joint 132 being rotationally moved by the sensor gear 120 after the sensor gear 120 being rotated in the pull out direction together with the V gear 114 (the lock mechanism 110 being actuated). Accordingly, the lock teeth 34A of the lock plate 34 are meshed with the ratchet teeth 30A of the lock gear 30 to regulate the rotation of the spool 24 in the pull out direction.

A sensor cover 136 made of resin and having a substantially rectangular parallelepiped box shape as an outer circumferential member is provided on the opposite side of the leg plate 12B of the sensor gear 120 and the surface on the leg plate 12B side of the sensor cover 136 is open. The sensor cover 136 accommodates therein and covers the lock mechanism 110 and also constitutes an outer circumference of the webbing take-up device 10. A predetermined number of engaging claws 138 constituting a fixing unit and having a U plate shape are formed on the circumferential wall of the sensor cover 136 and the engaging claw 138 is protruded from the circumferential wall of the sensor cover 136 toward the leg plate 12B side. A predetermined number of engaging sections 12D (see FIG. 2) constituting a fixing unit and having a rectangular shape are formed on the outer circumference of the leg plate 12B of the frame 12 and the engaging section 12D is protruded toward the outer side of the outer circumference of the leg plate 12B. The engaging claw 138 of the sensor cover 136 has the engaging section 12D inserted thereinto (engaged therewith) by elastic deformation whereby the sensor cover 136 is mounted on (fixed to) the leg plate 12B of the frame 12 together with the sensor holder 112.

A through box 140 in a substantially rectangular parallelepiped box shape is formed in the upper part of the sensor cover 136 and the through box 140 is protruded upward from another portion of the sensor cover 136 and the inside thereof is open to the lower side and the leg plate 12B side. The through box 140 has a through hole 142 in a substantially semi-elliptic shape penetrate-formed through an upper wall of the through box 140 and the through hole 142 is open to the leg plate 12B side and is passed through by the cylinder 66 (see FIG. 2).

Figure 6:
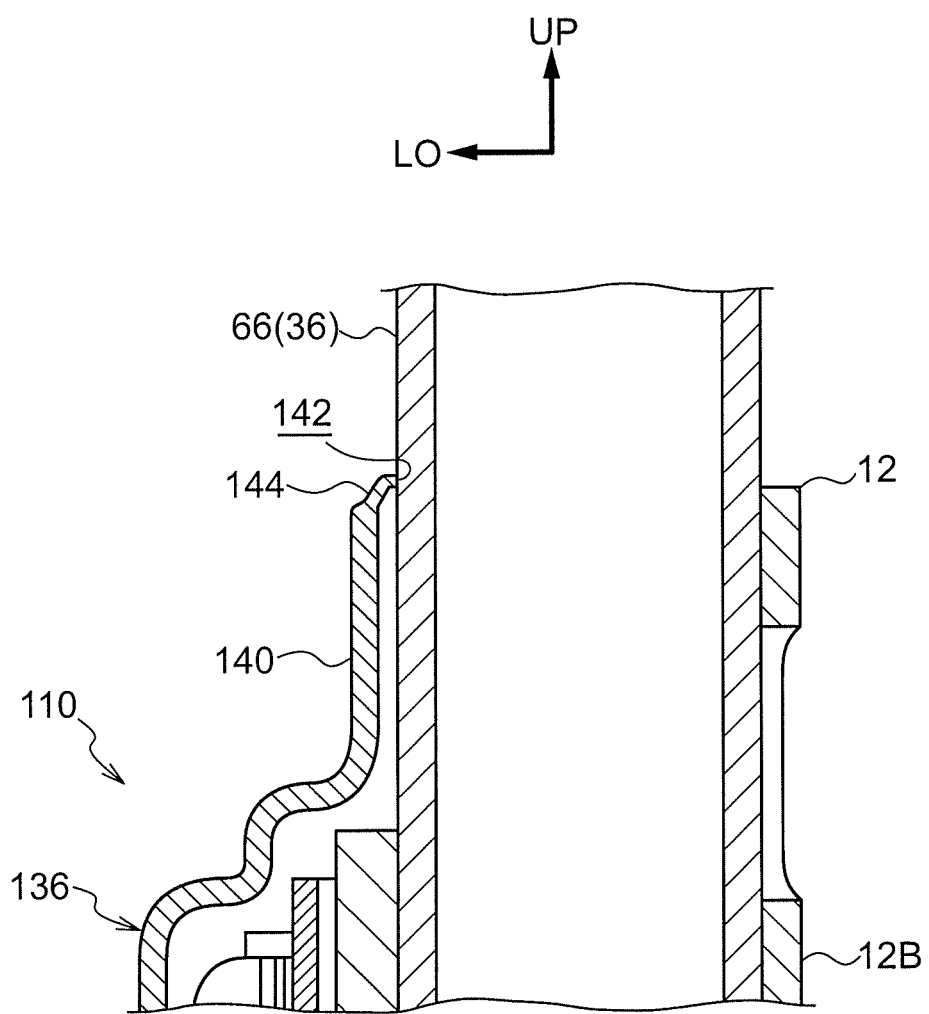
FIG. 6 is a sectional view showing principal sections of the webbing take-up device according to the first embodiment of the invention when viewed from the inner side in the vehicle width direction.
Figure 7:
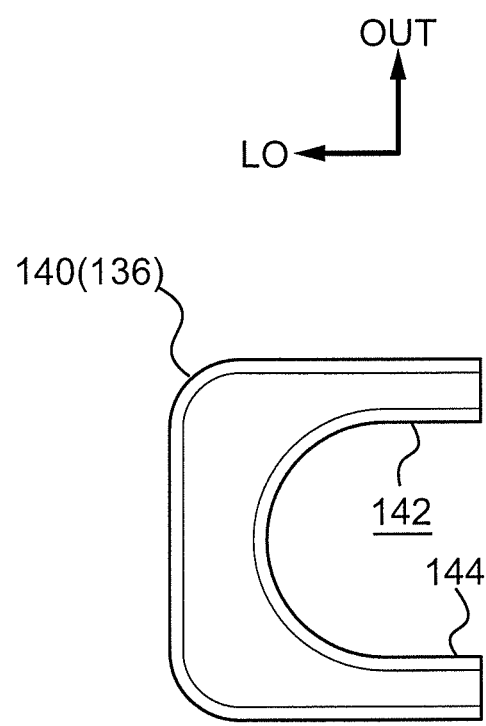
FIG. 7 is a plan view showing principal sections of a sensor cover of the webbing take-up device according to the first embodiment of the invention when viewed from the upper side.

As shown in FIGS. 6 and 7, a flexible section 144 (an elastic section) having a reversed L shaped cross section is formed on the upper wall of the through box 140 all around the through hole 142, and the flexible section 144 is thinned (for example, thinned to ½ or less) compared with a portion of the sensor cover 136 below the flexible section 144. The whole of a base end (a lower end) of the flexible section 144 is arranged on substantially the same level as an upper end surface of the leg plate 12B and a base end side portion of the flexible section 144 is inclined such that it is directed toward the cylinder 66 side as positioned more upper side in the axial direction of the cylinder 66. A tip end side (upper side) portion of the flexible section 144 is arranged in a direction perpendicular to the axial direction of the cylinder 66 and projected to the cylinder 66 side, and the tip end of the flexible section 144 constitutes the outer circumference of the through hole 142. The flexible section 144 is flexure-bent (elastically deformed) with the tip thereof pressed and abutted on the outer circumferential surface of the cylinder 66 whereby a gap between the outer circumference of the through hole 142 and the outer circumferential surface of the cylinder 66 is closed by the flexible section 144 to suppress entering of foreign matter such as dust into the sensor cover 136 through the gap, and also vibration of the cylinder 66 with regard to the frame 12 is suppressed.

Next, the operation of the present embodiment will be described.

In the webbing take-up device 10 configured as described above, when the webbing 26 is applied to a passenger sitting in a seat of a vehicle, looseness of the webbing 26 is eliminated by an urging mechanism acting an urging force on the spool 24 in the winding direction.

When the vehicle collides, the webbing 26 is rapidly pulled out from the spool 24 or the vehicle is rapidly decelerated to actuate the lock mechanism so that the lock teeth 34A of the lock plate 34 are meshed with the ratchet teeth 30A of the lock gear 30. Accordingly, pulling out of the webbing 26 from the spool 24 is regulated by the rotation of the lock gear 30 in the pull out direction being regulated and the rotation of the spool 24 in the pull out direction being regulated so that the passenger is restrained by the webbing 26.

Further, when the vehicle collides, the gas generator 80 instantaneously generates a high-pressure gas by the pretensioner mechanism 36 being actuated under control of the control device to supply the gas to the upper end (one side end) inside the cylinder 66. Thus, with the pressure of the gas received by the piston 88 (the base section 90 and the flange 92) and the X ring 94 from above while maintaining a state in which a space between the cylinder 66 and the piston 88 being sealed by the X ring 94, the anchor pin 42 of the gear case 38 that anchors (catches) the rack 96 (rack teeth 96A) of the piston 88 is broken by the rack teeth 96A and the piston 88 and the X ring 94 are moved downward (the other side). Accordingly, the rack 96 (rack teeth 96A) of the piston 88 is meshed with the gear 52 (pinion teeth 52A) of the pinion 50 so that the pinion 50 is rotated in the winding direction.

When the pinion 50 is rotated in the winding direction, with the meshing section 48A of the clutch plate 44 being moved from the portion on the side of the winding direction of the convex portions 56A in the clutch section 56 of the pinion 50 to the portion on the side of the pull out direction, the meshing section 48A is moved to the side of the outer circumferential surface of the clutch recess portion 32 of the lock gear 30 while the projecting sections 48 of the clutch plate 44 being deformed and moved to the side of the outer circumference of the clutch plate 44. Thus, with the meshing section 48A being meshed (engaged) between the clutch section 56 (circumferential surface of the convex portions 56A) and the lock gear 30 (outer circumferential surface of the clutch recess portion 32), the pinion 50, the clutch plate 44, the lock gear 30, the torsion shaft 28, and the spool 24 are made integrally rotatable. Accordingly, with the holding pins 40 of the gear case 38 fitted into the mounting holes 46 of the clutch plate 44 being broken by the circumferential edge of the mounting holes 46 to release holding of the clutch plate 44 to the gear case 38, the pinion 50, the clutch plate 44, the lock gear 30, the torsion shaft 28, and the spool 24 are integrally rotated in the winding direction. Thus, the webbing 26 is wound by the spool 24, increasing a restraint force of the passenger by the webbing 26.

Figure 5:
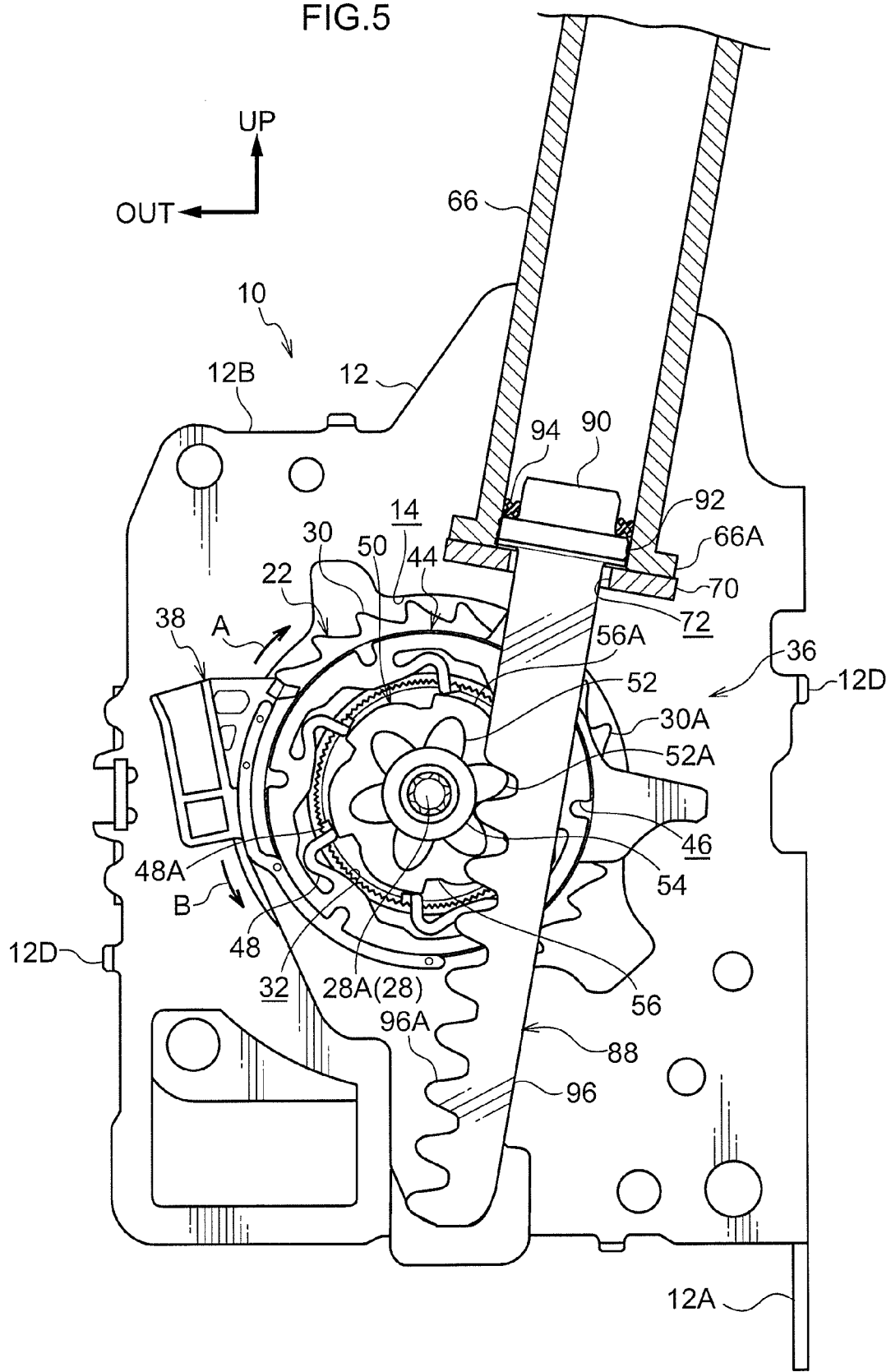
FIG. 5 is a side view showing a pretensioner mechanism in the webbing take-up device according to the first embodiment of the invention after an operation when viewed from one side in the vehicle front and rear direction.

As shown in FIG. 5, when the flange 92 of the piston 88 abuts the piston stopper 70, downward movement of the piston 88 and the X ring 94 is stopped and actuation of the pretensioner mechanism 36 is finished. At this time, a state in which a space between the cylinder 66 and the piston 88 is sealed by the X ring 94 is maintained and thus, a high-pressure gas remains inside the cylinder 66.

If, after the pretensioner mechanism 36 is actuated (after the actuation of the pretensioner mechanism 36 is finished), when the webbing take-up device 10 is disassembled for scrapping or recycling, first, fixing of the frame 12 (the back plate 12A) to the vehicle is released and the connector 86 is removed from the gas generator 80 to remove the webbing take-up device 10 from the vehicle. Also, insertion of the engaging section 12D of the frame 12 (the leg plate 12B) into the engaging claw 138 of the sensor cover 136 is released to remove the lock mechanism 110 from the leg plate 12B.

Next, to disassemble the pretensioner mechanism 36, both ends in the longitudinal direction of the cylinder holder 68 are disengaged from the frame 12 (the leg plate 12B) to remove the cylinder holder 68 from the leg plate 12B. Further, by removing the cover plate 58 from the leg plate 12B by removing four fixing screws 60 of the cover plate 58, fitting of the circumferential edge section 66A of the cylinder 66 and the piston stopper 70 into the third anchor hole 64 of the cover plate 58, fitting of the circumferential edge section 66A of the cylinder 66 into the first anchor hole 18 of the leg plate 12B, and fitting of the piston stopper 70 into the second anchor hole 20 of the leg plate 12B are released. Then, cylinder 66 and the piston stopper 70 are separated and the piston 88 is pulled out (removed) from the cylinder 66 to separate the piston 88 from the cylinder 66.

With the screw 78 screwed into the exhaust hole 74 of the cylinder 66, the plate 76 is fixed to the cylinder 66 and also the exhaust hole 74 is blocked (closed) by the screw 78, and the covering section 76A of the plate 76 covers the two fixing screws 60 at the upper part of the cover plate 58.

Thus, the cover plate 58 cannot be removed from the leg plate 12B of the frame 12 and thereafter the cylinder 66 and the piston 88 cannot be separated before covering of the two fixing screws 60 at the upper part of the cover plate 58 with the covering section 76A of the plate 76 being released by removing the screw 78 from the exhaust hole 74 of the cylinder 66 and by removing the plate 76 from the cylinder 66 (the cover plate 58 can be removed from the leg plate 12B of the frame 12 and thereafter the cylinder 66 and the piston 88 can be separated only after covering of the two fixing screws 60 at the upper part of the cover plate 58 with the covering section 76A of the plate 76 being released by removing the screw 78 from the exhaust hole 74 of the cylinder 66 and by removing the plate 76 from the cylinder 66.)

That is, it is necessary to remove the plate 76 from the cylinder 66 before separating the cylinder 66 and the piston 88. When the plate 76 is removed from the cylinder 66, by the screw 78 being removed from the exhaust hole 74 of the cylinder 66 such that the screw 78 opens the exhaust hole 74, a high-pressure gas inside the cylinder 66 is discharged via the exhaust hole 74.

Accordingly, before the cylinder 66 and the piston 88 are separated, a high-pressure gas inside the cylinder 66 can surely be discharged by the plate 76 being removed from the cylinder 66 and the screw 78 opening the exhaust hole 74.

Further, when the screw 78 is removed from the exhaust hole 74 of the cylinder 66, the screw 78 gradually opens the exhaust hole 74 (the exhaust hole 74 is gradually opened according to the screw 78 being removed from the exhaust hole 74). Thus, the high-pressure gas inside the cylinder 66 can gradually be discharged and therefore the high-pressure gas inside the cylinder 66 can be suppressed from rapidly being discharged.

The work to remove the plate 76 from the cylinder 66 is (corresponds to) the work in which the screw 78 opens the exhaust hole 74 of the cylinder 66. Thus, when the plate 76 is removed from the cylinder 66, the high-pressure gas inside the cylinder 66 can automatically be discharged.

Further, with the two fixing screws 60 being made removable by covering of the two fixing screws 60 at the upper part of the cover plate 58 being released by the covering section 76A of the plate 76, the cover plate 58 is made removable from the leg plate 12B of the frame 12 and the cylinder 66 and the piston 88 are made separable. Thus, with a simple configuration of providing the covering section 76A at the plate 76, the cylinder 66 and the piston 88 can be made separable after the plate 76 being removed from the cylinder 66.

Moreover, the covering section 76A of the plate 76 covers the two fixing screws 60 at the upper part of the cover plate 58. Thus, even if the two fixing screws 60 at the lower part of the cover plate 58 are removed before the plate 76 being removed from the cylinder 66, the cover plate 58 cannot be removed from the leg plate 12B of the frame 12 further cannot be moved with respect to the leg plate 12B. Accordingly, before the cylinder 66 and the piston 88 are separated, it is still possible to surely discharge the high-pressure gas inside the cylinder 66.

When assembling the piston 88 and the X ring 94 to the cylinder 66, the exhaust hole 74 of the cylinder 66 is left open without the plate 76 being fixed to the cylinder 66. After the X ring 94 being fitted to the outer circumference of the base section 90 of the piston 88, the piston 88 (including the X ring 94) is inserted into the cylinder 66 from the lower end side, from the base section 90 side.

The exhaust hole 74 is penetrate-formed through the upper part of the cylinder 66.

Thus, when inserting the piston 88 (including the X ring 94) into the cylinder 66 from the lower end side form the base section 90 side, if the upper end of the cylinder 66 is closed (blocked) by the gas generator 80, the air pressure (internal pressure) inside the cylinder 66 can be suppressed from rising by the air inside the cylinder 66 being discharged via the exhaust hole 74 even if the space between the cylinder 66 and the piston 88 is sealed with the X ring 94. Accordingly, the piston 88 and the X ring 94 can easily be assembled into the cylinder 66.

MODIFICATION EXAMPLE

Figure 8:
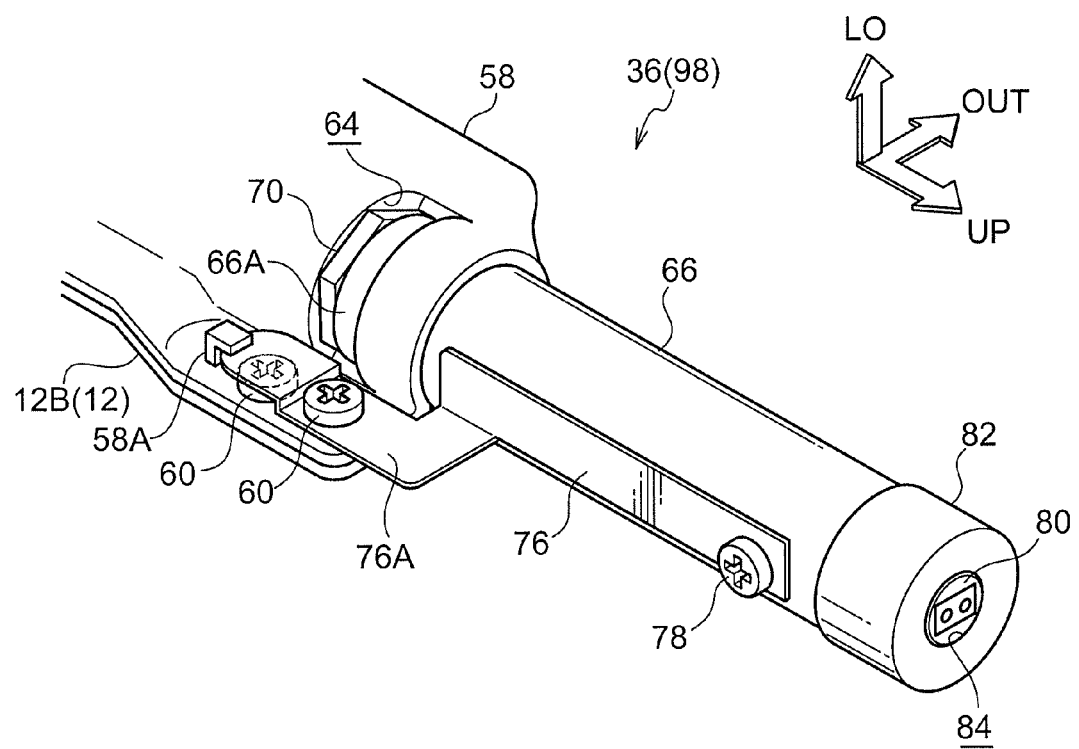
FIG. 8 is a perspective view showing principal sections of the webbing take-up device according to a modification of the first embodiment of the invention when viewed from the inner side and from the upper side in the vehicle width direction.

In FIG. 8, principal sections of a webbing take-up device 98 according to a modification of the first embodiment are shown as a perspective view when viewed from the inner side in the vehicle width direction and from the upper side.

As shown in FIG. 8, in the webbing take-up device 98 according to the embodiment, an anchor (connect or catch) section 58A in an L-rod shape is integrally formed as a protrusion at the cover plate 58, near the upper part of the cover plate 58 in a portion on the back plate 12A side, and the tip side portion of the anchor section 58A is projected upward.

The tip end (the lower end) of the covering section 76A in the lower part of the plate 76 is protruded at the opposite side of the leg plate 12B and has an L-shaped cross section, and the tip end of the covering section 76A covers the fixing screw 60 which is a lower side screw in the upper part fixing screws 60 of the cover plate 58. Further, the tip end of the covering section 76A is inserted into the anchor section 58A of the cover plate 58 whereby the anchor section 58A is enabled to stop movement of the tip end of the covering section 76A to the opposite side of the cover plate 58. The vicinity of the tip end of the covering section 76A is fixed (tightened) to the leg plate 12B by the fixing screw 60 which is an upper side screw in the upper part fixing screws 60 of the cover plate 58.

According to the present modified embodiment, operations and effects similar to those in the first embodiment can be achieved.

Particularly in the present modified embodiment, the tip end of the covering section 76A of the plate 76 covers the one fixing screw 60 which is the lower side screw in the upper part fixing screws 60 of the cover plate 58, and the anchor section 58A is enabled to stop movement of the tip end of the covering section 76A to the opposite side of the cover plate 58. Thus, even if the two fixing screws 60 in the lower part of the cover plate 58 and the one fixing screw 60 which is the upper side screw in the upper part fixing screws 60 of the cover plate 58 are removed before the plate 76 being removed from the cylinder 66, rotational movement of the plate 76 around the screw 78 is stopped by the anchor section 58A so covering of the one fixing screw 60 which is the lower side screw in the upper part fixing screws 60 of the cover plate 58 with the tip end of the covering section 76A cannot be released whereby the cover plate 58 cannot be removed from the leg plate 12B of the frame 12 further the cover plate 58 cannot be moved with respect to the leg plate 12B before the screw 78 is removed from the exhaust hole 74 of the cylinder 66 (covering of the one fixing screw 60 which is the lower side screw in the upper part fixing screws 60 of the cover plate 58 with the tip end of the covering section 76A can be released whereby the cover plate 58 can be removed from the leg plate 12B of the frame 12 further the cover plate 58 can be moved with respect to the leg plate 12B only after the screw 78 is removed from the exhaust hole 74 of the cylinder 66). Therefore, before the cylinder 66 and the piston 88 are separated, the high-pressure gas inside the cylinder 66 can surely be discharged.

Second Embodiment

Figure 9A:
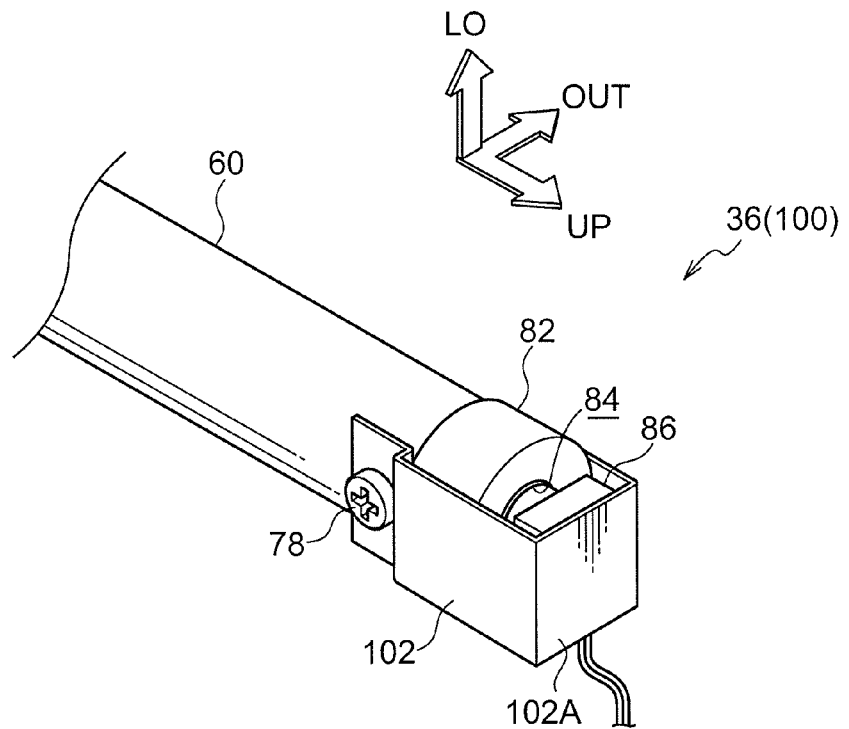
FIGS. 9A and 9B are diagrams showing principal sections of the webbing take-up device according to a second embodiment of the invention.
Figure 9B:
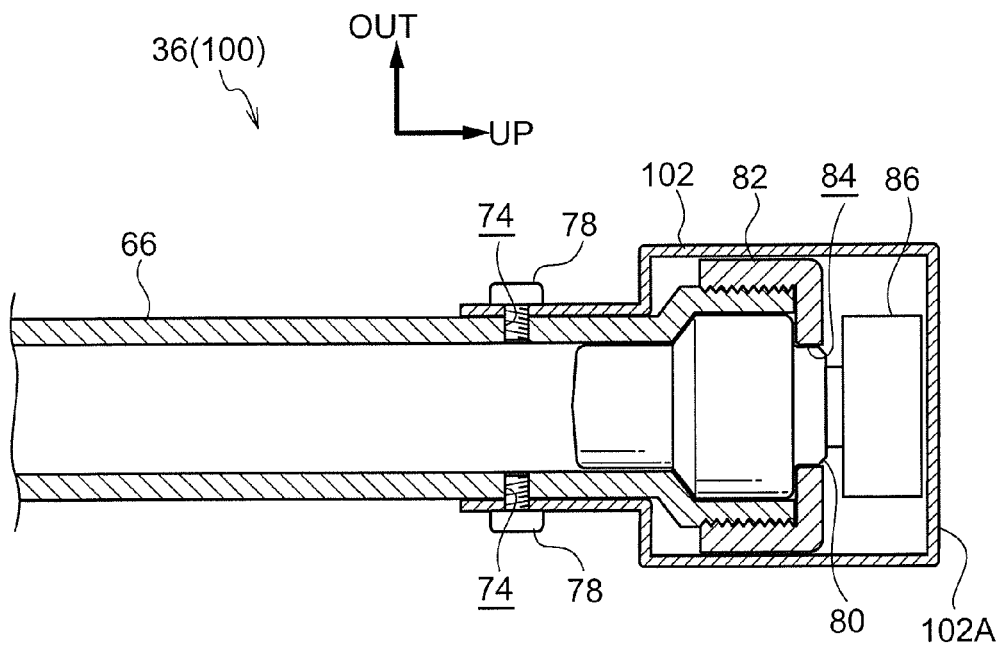

FIG. 9A shows principal sections of a webbing take-up device 100 according to a second embodiment of the present invention as a perspective view when viewed from the inner side in the vehicle width direction and the upper side and FIG. 9B shows principal sections of the webbing take-up device 100 as a sectional view when viewed from one side in the vehicle front and rear direction.

The webbing take-up device 100 according to the present embodiment has a configuration almost the same as the configuration of the first embodiment, but is different in the following respect.

The webbing take-up device 100 according to the present embodiment is not provided with the plate 76 in the first embodiment.

As shown in FIGS. 9A and 9B, the cylinder 66 has a pair (plural) of exhaust ports 74 (vent holes) in a circular shape penetrate-formed through the upper part (near the upper end) of the cylinder 66 and the pair of exhaust ports 74 face each other in the diameter direction of the cylinder 66. Both ends of a plate 102, which is in a plate shape having a U-shaped cross section as a removal member, in the longitudinal direction are fixed (tightened) to the cylinder 66 by the screws 78 at (through) the pair of exhaust ports 74. That is, the screw 78 is screwed into the exhaust hole 74 and the screw 78 blocks (closes) the exhaust hole 74.

A covering section 102A as a restriction section is provided in the intermediate section in the longitudinal direction of the plate 102, and the covering section 102A covers the connector 86 from above (opposite side of the gas generator 80). Accordingly, the covering section 102A makes the connector 86 unremovable from the gas generator 80.

Thus, when the webbing take-up device 100 is disassembled for scrapping or recycling after the pretensioner mechanism 36 is actuated (after the actuation of the pretensioner mechanism 36 is finished), the connector 86 cannot be removed from the gas generator 80 and thereafter the cylinder 66 and the piston 88 cannot be separated before covering over the connector 86 with the covering section 102A of the plate 102 being released by removing the pair of screws 78 from the pair of exhaust ports 74 of the cylinder 66 and by removing the plate 102 from the cylinder 66 (the connector 86 can be removed from the gas generator 80 and thereafter the cylinder 66 and the piston 88 can be separated only after covering over the connector 86 with the covering section 102A of the plate 102 being released by removing the pair of screws 78 from the pair of exhaust ports 74 of the cylinder 66 and by removing the plate 102 from the cylinder 66).

That is, it is necessary to remove the plate 102 from the cylinder 66 before separating the cylinder 66 and the piston 88. When the plate 102 is removed from the cylinder 66, a high-pressure gas inside the cylinder 66 is discharged via the exhaust holes 74 by the exhaust holes 74 being opened by the screws 78 with the screws 78 being removed from the exhaust holes 74 of the cylinder 66.

Accordingly, also in the present embodiment, operations and effects similar to those in the first embodiment can be achieved.

Further, the cylinder 66 has the pair of exhaust ports 74 penetrate-formed therethrough and the screw 78 is screwed into each of the pair of exhaust ports 74 to fix the plate 102 to the cylinder 66.

Thus, when the high-pressure gas in the cylinder 66 is discharged via one exhaust hole 74 by removing one screw 78 from the one exhaust hole 74, the other screw 78 remains screwed into the other exhaust hole 74 and the plate 102 is still fixed to the cylinder 66. Accordingly, when the high-pressure gas in the cylinder 66 is discharged, the plate 102 can be prevented from being moved and separated with respect to the cylinder 66.

Third Embodiment

Figure 10A:
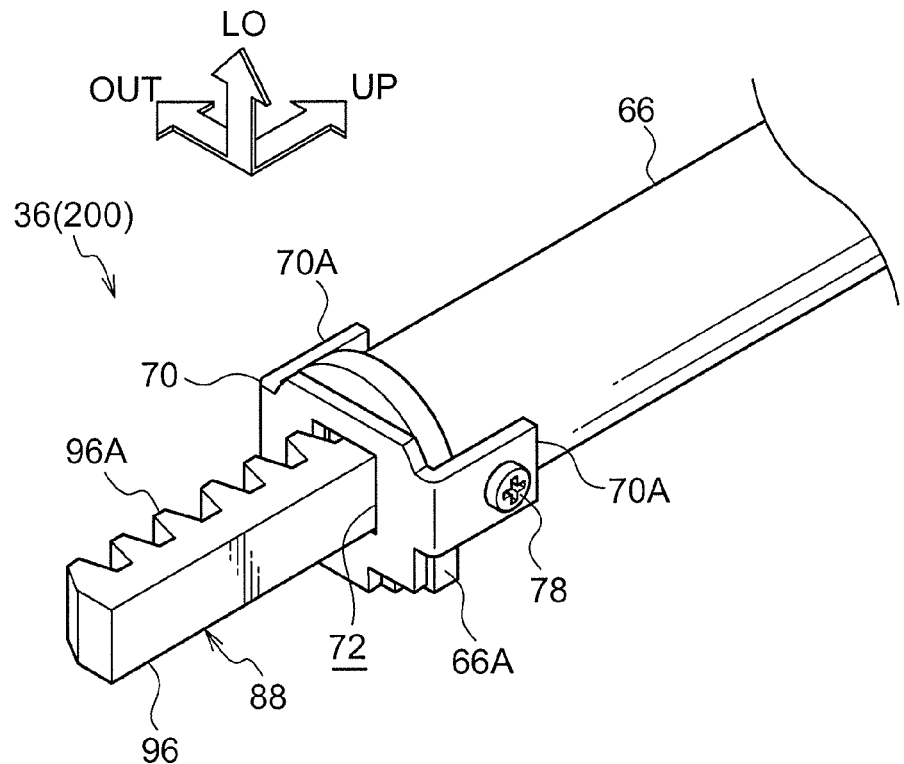
FIGS. 10A and 10B are diagrams showing principal sections of the webbing take-up device according to a third embodiment of the invention.
Figure 10B:
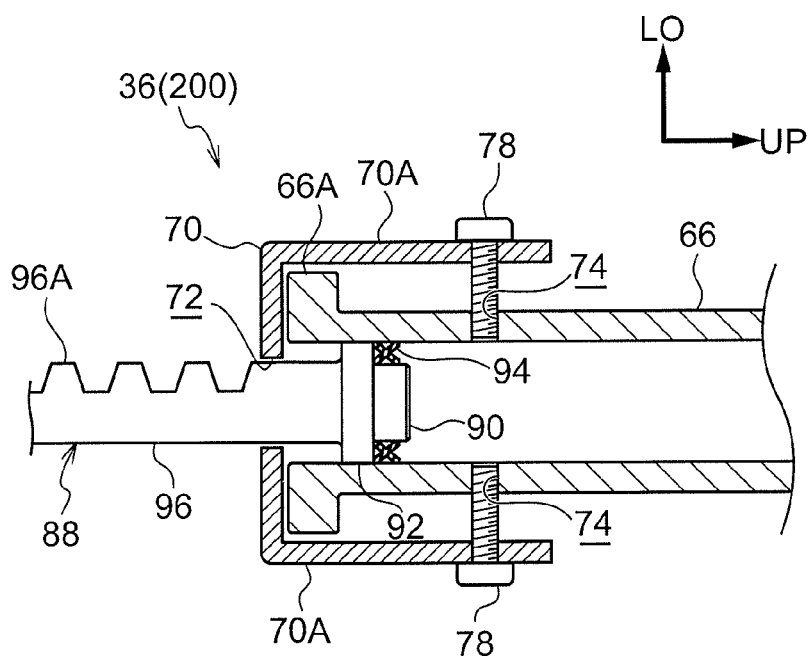

FIG. 10A shows principal sections of a webbing take-up device 200 according to a third embodiment of the present invention as a perspective view when viewed from the inner side in the vehicle width direction and the lower side, and FIG. 10B shows principal sections of the webbing take-up device 200 as a sectional view when viewed from the inner side in the vehicle width direction.

The webbing take-up device 200 according to the present embodiment has a configuration almost the same as the configuration of the first embodiment, but is different in the following respect.

The webbing take-up device 200 according to the present embodiment is not provided with the plate 76 in the first embodiment.

As shown in FIGS. 10A and 10B, the piston stopper 70 functions as a removal member and a pair (plural) of projecting sections 70A in a long plate shape is integrally formed at a circumferential section of the piston stopper 70. The pair of projecting sections 70A is projected upward (the side of the cylinder 66) from the piston stopper 70 and the pair of projecting sections 70A face each other in the diameter direction of the cylinder 66.

The cylinder 66 has a pair (plural) of exhaust ports 74 (vent holes) in a circular shape penetrate-formed through at the lower part (near the lower end) of the cylinder 66, and the pair of exhaust ports 74 face each other in the diameter direction of the cylinder 66. The pair of projecting sections 70A of the piston stopper 70 is fixed (tightened) to the cylinder 66 by the screws 78 at (through) the pair of exhaust ports 74. That is, the screw 78 is screwed into the exhaust hole 74 and the screw 78 blocks (closes) the exhaust hole 74.

Thus, when the webbing take-up device 200 is disassembled for scrapping or recycling after the pretensioner mechanism 36 is actuated (after the actuation of the pretensioner mechanism 36 is terminated), as shown in FIG. 11, the cylinder 66 and the piston 88 cannot be separated before removing the pair of screws 78 from the pair of exhaust ports 74 of the cylinder 66 and removing the piston stopper 70 from the cylinder 66 (the cylinder 66 and the piston 88 can be separated only after removing the pair of screws 78 from the pair of exhaust ports 74 of the cylinder 66 and removing the piston stopper 70 from the cylinder 66).

That is, it is necessary to remove the piston stopper 70 from the cylinder 66 before separating the cylinder 66 and the piston 88. When the piston stopper 70 is removed from the cylinder 66, a high-pressure gas inside the cylinder 66 is discharged via the exhaust holes 74 by the exhaust holes 74 being opened by the screw 78 with the screws 78 being removed from the exhaust holes 74 of the cylinder 66.

Accordingly, also in the present embodiment, operations and effects similar to those in the first embodiment can be achieved.

Further, the cylinder 66 has the pair of exhaust ports 74 penetrate-formed therethrough and the screw 78 is screwed into each of the pair of exhaust ports 74 to fix the piston stopper 70 to the cylinder 66.

Thus, when the high-pressure gas in the cylinder 66 is discharged via one exhaust hole 74 by removing one screw 78 from the one exhaust hole 74, the other screw 78 remains screwed into the other exhaust hole 74 and the piston stopper 70 is fixed to the cylinder 66. Accordingly, when the high-pressure gas in the cylinder 66 is discharged, the piston stopper 70 can be prevented from being moved and separated with respect to the cylinder 66.

Fourth Embodiment

Figure 12A:
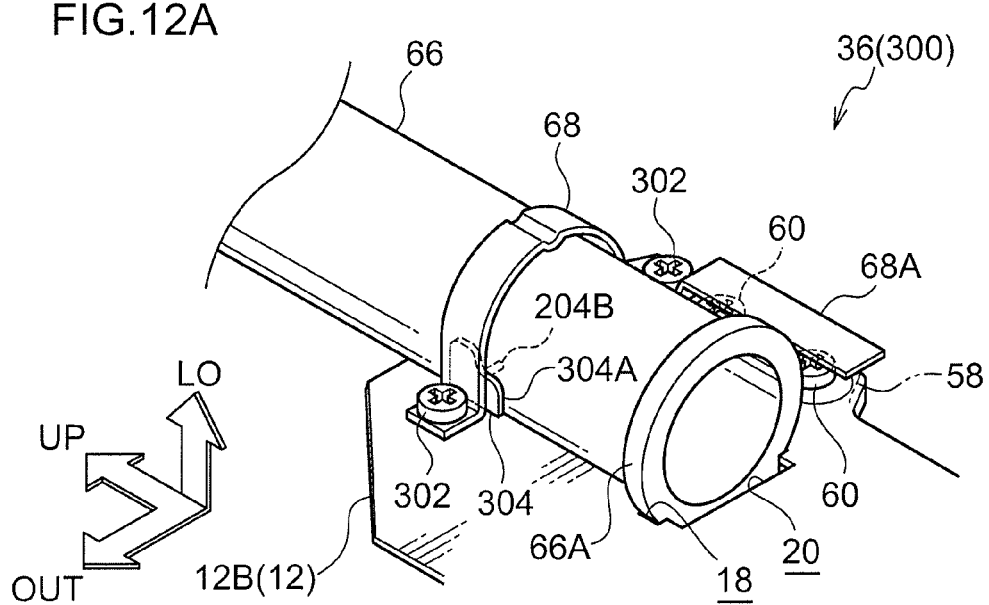
FIGS. 12A and 12B are diagrams showing principal sections of the webbing take-up device according to a fourth embodiment of the invention when viewed from the outer side and the lower side in the vehicle width direction.
Figure 12B:
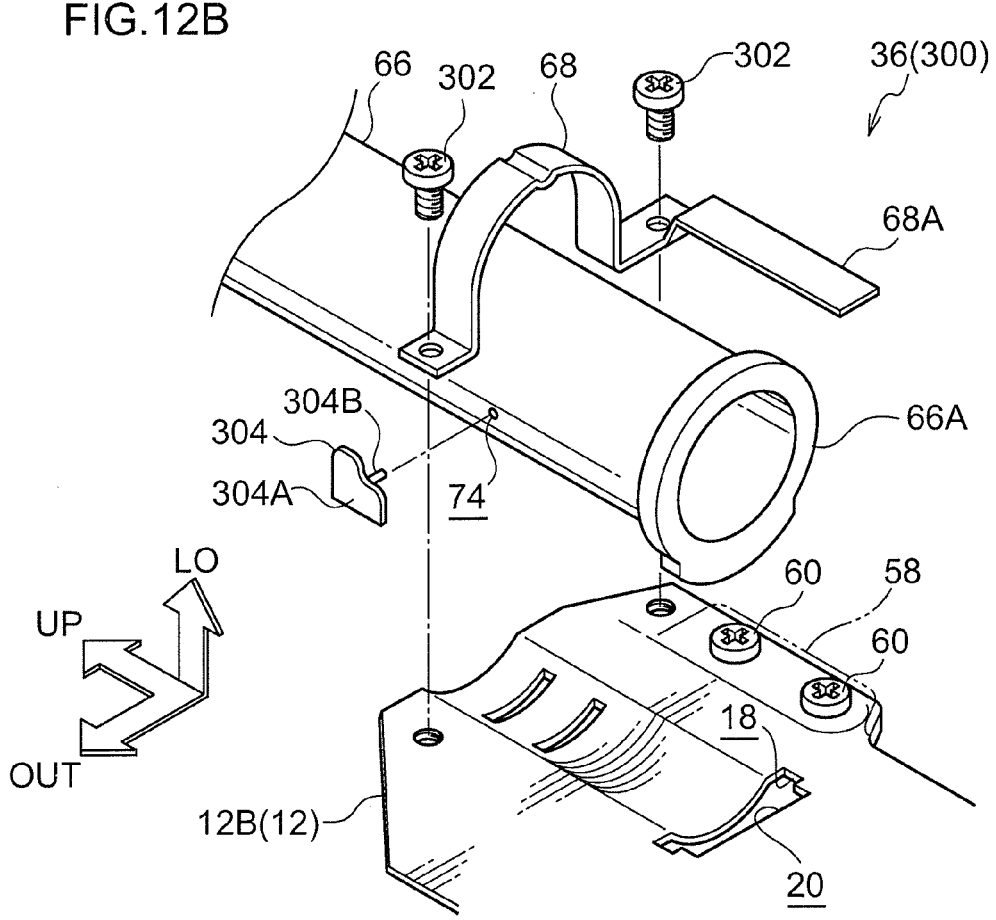

FIG. 12A shows principal sections of a webbing take-up device 300 according to a fourth embodiment of the present invention as a perspective view when viewed from the outer side in the vehicle width direction and the lower side and FIG. 12B shows principal sections of the webbing take-up device 300 as an exploded perspective view when viewed from the outer side in the vehicle width direction and the lower side.

The webbing take-up device 300 according to the present embodiment has a configuration almost the same as the configuration of the first embodiment, but is different in the following respect.

The webbing take-up device 300 according to the present embodiment is not provided with the plate 76 and the screw 78 in the first embodiment.

As shown in FIGS. 12A and 12B, the cylinder holder 68 functions as a removal member, and the cylinder holder 68 is fixed to the leg plate 12B by being fixed (tightened) to the leg plate 12B of the frame 12 at both ends of the cylinder holder 68 in the longitudinal direction by mounting screws 302. Accordingly, the cylinder holder 68 holds the cylinder 66 so s to restrict movement of the cylinder 66 in the diameter direction.

A covering section 68A in a long rectangular plate shape as a restriction section is provided at one end in the longitudinal direction of the cylinder holder 68 and the covering section 68A is projected downward from the one end in the longitudinal direction of the cylinder holder 68. The covering section 68A covers two (plural) fixing screws 60 at the upper part of the cover plate 58 and the covering section 68A makes the two fixing screws 60 unremovable.

The cylinder 66 has the exhaust hole 74 (vent hole) in a circular shape penetrate-formed through the lower part (near the lower end) of the cylinder 66 and the exhaust hole 74 faces the cylinder holder 68.

A packing 304 (sealing material) as a closing member (blocking member) is provided between the lower part (the exhaust hole 74) of the cylinder 66 and the cylinder holder 68, and the packing 304 is made of rubber or the like to have elasticity and sealing properties. The packing 304 is provided with a head portion 304A in a flat plate shape and a leg portion 304B in a column-cylindrical shape, and the leg portion 304B is projected from the center of the head portion 304A. The head portion 304A is sandwiched between the cylinder 66 and the cylinder holder 68 in an elastically contracted state and the leg portion 304B is press-fitted into the exhaust hole 74 of the cylinder 66 in an elastically contracted state so that the packing 304 is made unmovable by being stopped by the cylinder holder 68 and the cylinder 66 at the head portion 304A and the packing 304 blocks (closes) the exhaust hole 74 for sealing at the leg portion 304B.

When the webbing take-up device 300 is disassembled for scrapping or recycling after the pretensioner mechanism 36 is actuated (after the actuation of the pretensioner mechanism 36 is terminated), the cover plate 58 cannot be removed from the leg plate 12B of the frame 12 and thereafter the cylinder 66 and the piston 88 can be separated before covering of the two fixing screws 60 at the upper part of the cover plate 58 with the covering section 68A of the cylinder holder 68 being released by removing the pair (plural) of mounting screws 302 of the cylinder holder 68 and by removing the cylinder holder 68 from the leg plate 12B of the frame 12 (the cover plate 58 can be removed from the leg plate 12B of the frame 12 and thereafter the cylinder 66 and the piston 88 can be separated only after covering of the two fixing screws 60 at the upper part of the cover plate 58 with the covering section 68A of the cylinder holder 68 being released by removing the pair (plural) of mounting screws 302 of the cylinder holder 68 and by removing the cylinder holder 68 from the leg plate 12B of the frame 12).

That is, it is necessary to remove the cylinder holder 68 from the leg plate 12B of the frame 12 before separating the cylinder 66 and the piston 88. When the cylinder holder 68 is removed from the leg plate 12B of the frame 12, a high-pressure gas inside the cylinder 66 is discharged via the exhaust hole 74 by the exhaust hole 74 being opened by the packing 304 with the packing 304 being removed from the cylinder 66.

Accordingly, also in the present embodiment, operations and effects similar to those in the first embodiment can be achieved.

Further, the packing 304 does not have a function to mount the cylinder holder 68. Thus, the shape and material of the packing 304 have more flexibility, and the packing 304 can effectively block the exhaust hole 74 by the exhaust hole 74 being blocked with airtightness by the packing 304. Accordingly, when the pretensioner mechanism 36 is actuated, a gas in the cylinder 66 can effectively be suppressed from being discharged via the exhaust hole 74.

Fifth Embodiment

Figure 13:
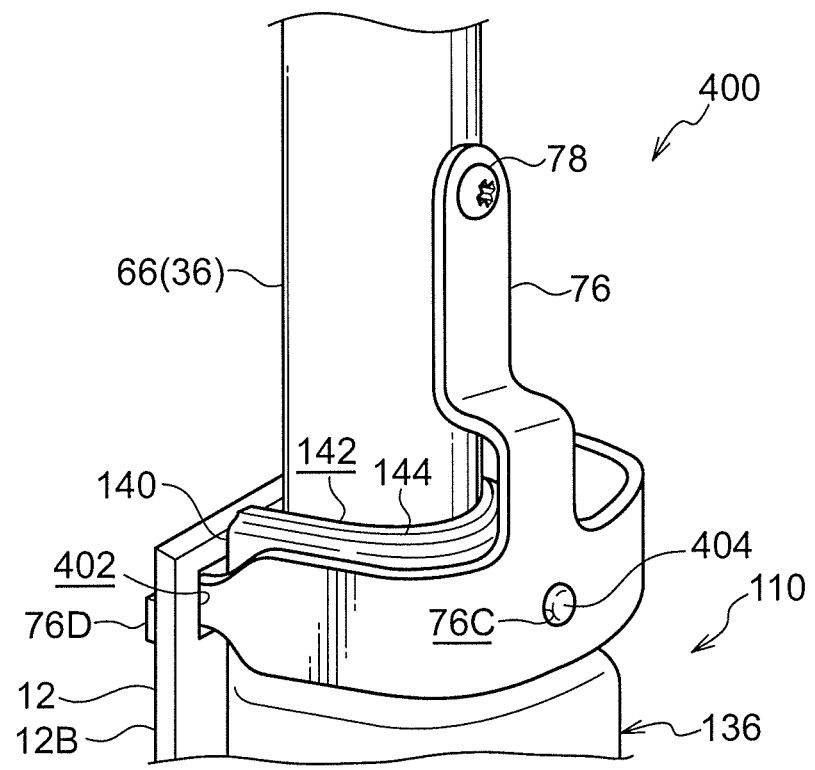
FIG. 13 is a perspective view showing principal sections of the webbing take-up device according to a fifth embodiment of the invention when viewed from the outer side in the vehicle width direction and from one side in the vehicle front and rear direction.
Figure 14:
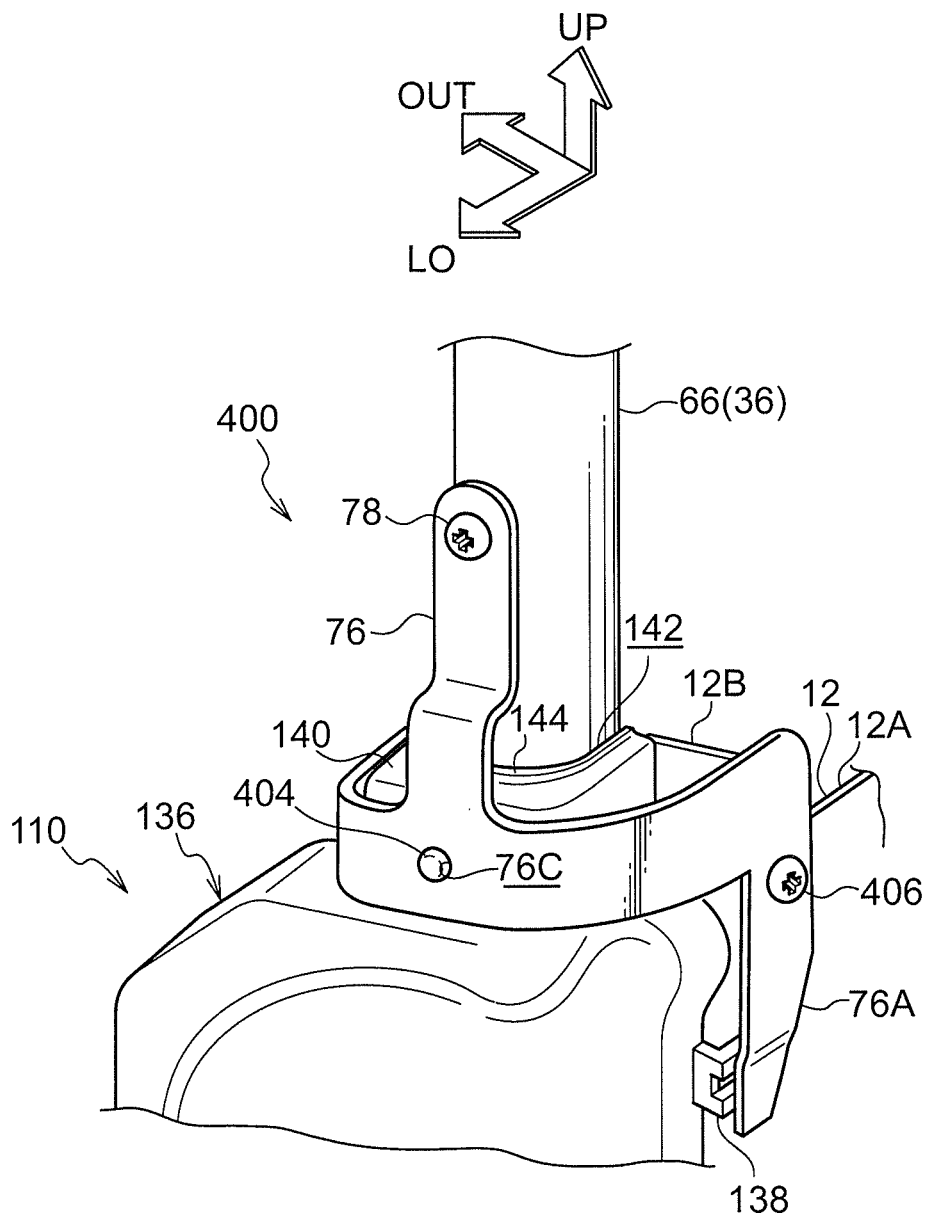
FIG. 14 is a perspective view showing principal sections of the webbing take-up device according to the fifth embodiment of the invention when viewed from the inner side in the vehicle width direction and from one side in the vehicle front and rear direction.
Figure 15:
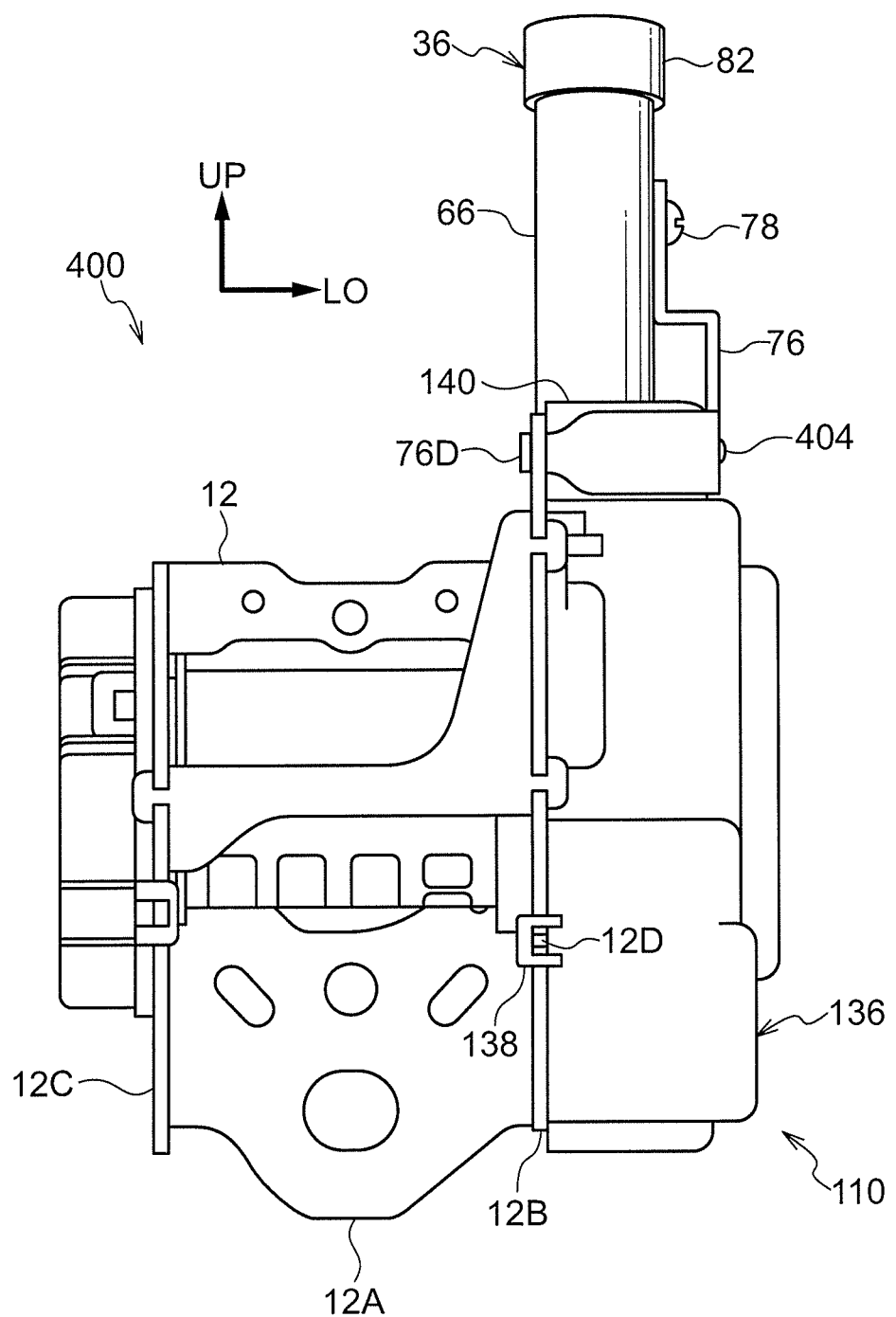
FIG. 15 is a front view showing the webbing take-up device according to the fifth embodiment of the invention when viewed from the outer side in the vehicle width direction.

FIG. 13 shows principal sections of a webbing take-up device 400 according to a fifth embodiment of the invention as a perspective view when viewed from the outer side in the vehicle width direction and from one side in the vehicle front and rear direction and FIG. 14 shows principal sections of the webbing take-up device 400 as a perspective view when viewed from the inner side in the vehicle width direction and from one side in the vehicle front and rear direction. Further, FIG. 15 shows the webbing take-up device 400 as a front view when viewed from the outer side in the vehicle width direction and FIG. 16 shows the webbing take-up device 400 as a rear view when viewed from the inner side in the width direction.

The webbing take-up device 400 according to the present embodiment has a configuration almost the same as the configuration of the first embodiment, but is different in the following respect.

As shown in FIG. 13, in the webbing take-up device 400 according to the present embodiment, a hook hole 402 in a rectangular shape is penetrate-formed through the upper part of the leg plate 12B of the frame 12.

The through box 140 of the sensor cover 136 has an inhibition pillar 404 in a cylindrical shape constituting an inhibition unit is penetrate-formed therein and the inhibition pillar 404 is protruded to the opposite side of the leg plate 12B from the through box 140.

As shown in FIGS. 13 to 16, the plate 76 constitutes the outer circumference of the webbing take-up device 400. The upper portion of the upper part of the plate 76 is protruded toward the leg plate 12B side (the cylinder 66 side) and is bent to have an L-shaped cross section and the upper end of the plate 76 is fixed (tightened) to the cylinder 66 (the exhaust hole 74) by the screw 78.

The intermediate section in the up and down direction of the plate 76 is formed to have a U-shaped cross section and is arranged on the outer circumference of the through box 140 of the sensor cover 136. The intermediate section in the up and down direction of the plate 76 has an inhibition hole 76C in a circular shape constituting the inhibition unit penetrate-formed through the center portion in the longitudinal direction, and the inhibition pillar 404 of the through box 140 is fitted (inserted) into the inhibition hole 76C. In the intermediate section in the up and down direction of the plate 76, a hook section 76D having an substantially L-shaped cross section is formed at one end (end on the opposite side of the back plate 12A of the frame 12) in the longitudinal direction, and the hook section 76D is inserted into the hook hole 402 of the leg plate 12B to be hooked on to the leg plate 12B.

The covering section 76A of the plate 76 is projected downward from the other end (end on the back plate 12A side) in the longitudinal direction of the intermediate section in the up and down direction of the plate 76 and the covering section 76A is fixed (tightened) to the back plate 12A by a mounting screw 406. The covering section 76A covers an insert-portion of the engaging section 12D of the frame 12 (the leg plate 12B) into the engaging claw 138 of the sensor cover 136 and the covering section 76A makes the insertion of the engaging section 12D into the engaging claw 138 unreleasable by stopping (preventing) elastic deformation (movement) of the engaging claw 138.

Thus, when the webbing take-up device 400 is disassembled for scrapping or recycling after the pretensioner mechanism 36 is actuated (after the actuation of the pretensioner mechanism 36 is finished), the cylinder 66 and the piston 88 cannot be separated after removing the lock mechanism 110 (including the sensor cover 136) from the leg plate 12B by releasing the insertion of the engaging section 12D into the engaging claw 138 before "removing the plate 76 from the cylinder 66 by removing the screw 78 from the exhaust hole 74 of the cylinder 66, fixing of the plate 76 (the covering section 76A) to the frame 12 (the back plate 12A) by the mounting screw 406 being released, and removing the plate 76 from the frame 12 by releasing hooking, onto the frame 12, of the plate 76 (the hook section 76D) (insertion of the leg plate 12B into the hook hole 402) (releasing of covering of the insert-portion of the engaging section 12D into the engaging claw 138 with the covering section 76A)".

(The cylinder 66 and the piston 88 can be separated after removing the lock mechanism 110 (including the sensor cover 136) from the leg plate 12B by releasing the insertion of the engaging section 12D into the engaging claw 138 only after "removing the plate 76 from the cylinder 66 by removing the screw 78 from the exhaust hole 74 of the cylinder 66, fixing of the plate 76 to the frame 12 by the mounting screw 406 being released, and removing the plate 76 from the frame 12 by releasing hooking, onto the frame 12, of the plate 76".)

That is, it is necessary to remove the plate 76 from the cylinder 66 and the frame 12 before separating the cylinder 66 and the piston 88. When the plate 76 is removed from the cylinder 66, a high-pressure gas inside the cylinder 66 is discharged via the exhaust hole 74 by the exhaust hole 74 being opened by the screw 78 with the screw 78 being removed from the exhaust hole 74 of the cylinder 66.

Accordingly, also in the present embodiment, operations and effects similar to those in the first embodiment can be achieved.

Further, the inhibition pillar 404 of the sensor cover 136 (the through box 140) is fitted into the inhibition hole 76C of the plate 76.

Thus, due to fitting of the inhibition pillar 404 into the inhibition hole 76C, movement of the sensor cover 136 to the opposite side of the back plate 12A and to the lower side is inhibited, even though "it is supposed that, before the plate 76 being removed from the cylinder 66 and the frame 12, fixing of the plate 76 (the covering section 76A) to the frame 12 (the back plate 12A) by the mounting screw 406 is released and the insertion of the engaging section 12D of the frame 12 (the leg plate 12B) into the engaging claw 138 of the sensor cover 136 regardless of the covering section 76A", movement of the sensor cover 136 to the opposite side of the back plate 12A and to the lower side is inhibited, due to fitting of the inhibition pillar 404 into the inhibition hole 76C.

Accordingly, the cylinder 66 and the piston 88 cannot be separated before removing the plate 76 from the cylinder 66 and the frame 12. A configuration capable of surely discharging a high-pressure gas in the cylinder 66 before separating the cylinder 66 and the piston 88 can be realized.

The plate 76 constitutes the outer circumference of the webbing take-up device 400. Thus, it can be suppressed that all parts on the outer circumference side further than the plate 76 of the webbing take-up device 400 becomes larger with the plate 76 being present inside the webbing take-up device 400. Moreover, a configuration can reliably be realized in which, when the webbing take-up device 400 is disassembled, the plate 76 is first removed from the cylinder 66 and the frame 12, a worker has an intention to remove plate 76 from the cylinder 66 and the frame 12 more easily, and a high-pressure gas in the cylinder 66 can surely be discharged before the cylinder 66 and the piston 88 being separated.

Further, only the through box 140 of the sensor cover 136 is present inside the intermediate section in the up and down direction of the plate 76 and, for example, the cover plate 58 of the pretensioner mechanism 36 is not present. Thus, the plate 76 can be made smaller.

In the first to fifth embodiments described above, a configuration in which the webbing 26 is wound around the spool 24 by the piston 88 (the moving member) being moved inside the cylinder 66 (the tube member) is adopted, but a configuration in which the webbing 26 is wound around the spool 24 by a ball (moving member) being moved inside a pipe (tube member) may be adopted.

What is claimed is:

1. A webbing take-up device comprising:
   a winding shaft that winds a webbing applied to a passenger of a vehicle by rotating in a winding direction;
   a tube member, into one side of which a gas is supplied at a predetermined occasion;
   a moving member mounted to the tube member by a removable mounting member, the moving member being that is moved to the other side of the tube member by pressure of the gas supplied into the one side of the tube member thereby rotating the winding shaft in the winding direction;
   a removal member at which an attachment portion attachable to the tube member is formed, and a restriction section which interferes with the separation of the tube member and the moving member when the removal member is attached to the tube member is formed, the removal member including the attachment portion and the restriction section being a one piece member; and
   a closing member that closes an exhaust port formed in the tube member and allows the gas inside the tube member to be discharged via the exhaust port to an outside of the tube member by the exhaust port being opened when the removal member is removed,
   wherein the closing member attaches the attachment portion of the removal member to the tube member, and
   the exhaust port is formed at a location of the tube member such that the exhaust port communicates an inside portion of the tube member where the gas is supplied in a pressurized state with an outside of the tube member.

2. The webbing take-up device of claim 1, wherein the restriction section allows separation of the tube member and the moving member when the removal member is detached and removed from the tube member.

3. The webbing take-up device of claim 1, wherein the closing member fixes the removal member to the tube member by the closing member being inserted in the exhaust port.

4. The webbing take-up device of claim 1, wherein, by the gas being supplied at the predetermined occasion into the one side of the tube member, the moving member protrudes from an open end portion which is at the other side of the tube member.

5. The webbing take-up device of claim 1, wherein the gas inside the tube member is discharged via the exhaust port to the outside of the tube member by the closing member being separated from the exhaust port so as to open the exhaust port.

6. The webbing take-up device of claim 1, wherein the gas inside the tube member is discharged via the exhaust port to the outside of the tube member by the closing member, which is inserted into the exhaust port so as to close the exhaust port and is inserted in a hole portion formed at the removal member being separated from the exhaust port so as to open the exhaust port and so as to be separable from the removal member.

7. The webbing take-up device of claim 1, wherein the closing member is attached to the tube member so as to attach the removal member to the tube member by the closing member being inserted in the exhaust port and being inserted in a hole formed at the removal member.

8. The webbing take-up device of claim 1,
wherein an attachment hole is formed at the attachment portion of the removal member, and
the closing member attaches the attachment portion of the removal member to the tube member by the closing member being inserted in the attachment hole and the exhaust port.

9. The webbing take-up device of claim 1,
wherein the closing member detachably mounts the attachment portion of the removal member to the tube member.

10. The webbing take-up device of claim 9, wherein the closing member is a fastener.

11. The webbing take-up device of claim 1, wherein:
the tube member is assembled between a mounting member and a device main body side member, and
the restriction section covers an attachment section, the mounting member and the device main body side member are attached by the attachment section with the tube member therebetween in a state in which the removal member is attached to the tube member.

\* \* \* \* \*